US011501294B2

(12) United States Patent
Li et al.

(10) Patent No.: US 11,501,294 B2
(45) Date of Patent: Nov. 15, 2022

(54) METHOD AND DEVICE FOR PROVIDING AND OBTAINING GRAPHIC CODE INFORMATION, AND TERMINAL

(71) Applicant: ADVANCED NEW TECHNOLOGIES CO., LTD., Grand Cayman (KY)

(72) Inventors: JiaJia Li, Hangzhou (CN); Xiaokai Zhou, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 304 days.

(21) Appl. No.: 16/247,346

(22) Filed: Jan. 14, 2019

(65) Prior Publication Data

US 2019/0147441 A1 May 16, 2019

Related U.S. Application Data

(63) Continuation of application No. PCT/CN2017/092449, filed on Jul. 11, 2017.

(30) Foreign Application Priority Data

Jul. 18, 2016 (CN) .......................... 201610566676.6

(51) Int. Cl.
*G06Q 20/38* (2012.01)
*G06Q 20/32* (2012.01)
*G06Q 20/36* (2012.01)

(52) U.S. Cl.
CPC ..... *G06Q 20/3829* (2013.01); *G06Q 20/3274* (2013.01); *G06Q 20/36* (2013.01); *G06Q 2220/00* (2013.01)

(58) Field of Classification Search
CPC ........... G06Q 20/3829; G06Q 20/3274; G06Q 20/36; G06Q 2220/00
See application file for complete search history.

(56) References Cited

U.S. PATENT DOCUMENTS 6,622,919 B1      9/2003   Wilz et al.
8,904,195 B1 *   12/2014   Rahat ................... G06F 21/445
                                                                  713/194

(Continued)

FOREIGN PATENT DOCUMENTS

AU       2015200102 A1     2/2015
CN          1453744 A     11/2003

(Continued)

OTHER PUBLICATIONS

Search Report for Taiwanese Application No. 106118717 dated Sep. 28, 2020.

(Continued)

*Primary Examiner* — Neha Patel
*Assistant Examiner* — Courtney P Jones

(57) ABSTRACT

A method for providing graphic code information is implementable by a device comprising a first module, a second module, and an interface module. The method comprises: the second module verifying through the interface module whether the first module is a trusted module; the second module receiving target user information through the interface module and verifying whether the target user information is in a logged-in state on the second module, wherein the target user information is pre-associated with the interface module; and after verifying that the first module is a trusted module and the target user information is in the logged-in state on the second module, the second module generating graphic code information and transmitting the graphic code information to the first module through the interface module.

20 Claims, 13 Drawing Sheets

(56) References Cited

U.S. PATENT DOCUMENTS

| | | | |
|---|---|---|---|
| 9,483,763 | B2 | 11/2016 | van Os et al. |
| 9,934,506 | B2 | 4/2018 | Keith |
| 10,049,202 | B1 | 8/2018 | Johansson et al. |
| 10,356,069 | B2 | 7/2019 | Johansson et al. |
| 10,453,050 | B1* | 10/2019 | Arumugam ........ G06Q 20/4014 |
| 2004/0019790 | A1 | 1/2004 | Aono et al. |
| 2012/0209790 | A1 | 8/2012 | Szydlo |
| 2013/0159186 | A1 | 6/2013 | Brudnicki et al. |
| 2013/0163762 | A1 | 6/2013 | Zhang et al. |
| 2013/0262317 | A1* | 10/2013 | Collinge ............ G06Q 20/3552 |
| | | | 705/71 |
| 2014/0006290 | A1 | 1/2014 | Hozanne et al. |
| 2014/0317686 | A1* | 10/2014 | Vetillard ............... G06F 21/606 |
| | | | 726/2 |
| 2014/0372320 | A1 | 12/2014 | Goldfarb et al. |
| 2015/0019443 | A1 | 1/2015 | Sheets et al. |
| 2015/0088756 | A1* | 3/2015 | Makhotin ............ G06Q 20/401 |
| | | | 705/71 |
| 2015/0095238 | A1 | 4/2015 | Khan et al. |
| 2015/0143116 | A1 | 5/2015 | Tang et al. |
| 2015/0178721 | A1* | 6/2015 | Pandiarajan ..... G06K 19/06037 |
| | | | 705/75 |
| 2015/0235196 | A1 | 8/2015 | Zhu et al. |
| 2015/0327072 | A1 | 11/2015 | Powell et al. |
| 2015/0332262 | A1 | 11/2015 | Lingappa |
| 2015/0348015 | A1* | 12/2015 | Ren ...................... G06Q 20/085 |
| | | | 705/41 |
| 2016/0080338 | A1* | 3/2016 | Wary .................... H04L 63/062 |
| | | | 713/171 |
| 2016/0234176 | A1* | 8/2016 | Chu ........................ H04L 63/06 |
| 2016/0253651 | A1 | 9/2016 | Park et al. |
| 2016/0358165 | A1 | 12/2016 | Maxwell |
| 2016/0364723 | A1* | 12/2016 | Reese ................ G06Q 20/4012 |
| 2017/0032370 | A1* | 2/2017 | Beltramino ...... G06Q 20/38215 |
| 2017/0061272 | A1* | 3/2017 | Deliwala ........... H04W 12/0431 |
| 2017/0286956 | A1* | 10/2017 | Richards ................ G07F 7/127 |
| 2018/0330362 | A1* | 11/2018 | Wu ...................... G06Q 20/386 |
| 2019/0087814 | A1 | 3/2019 | Lassouaoui et al. |
| 2019/0147441 | A1 | 5/2019 | Li et al. |
| 2019/0188682 | A1 | 6/2019 | Itwaru et al. |

FOREIGN PATENT DOCUMENTS

| | | | |
|---|---|---|---|
| CN | 101345898 | A | 1/2009 |
| CN | 102625309 | A | 8/2012 |
| CN | 102801724 | A | 11/2012 |
| CN | 102984139 | A | 3/2013 |
| CN | 103477585 | A | 12/2013 |
| CN | 103577984 | A | 2/2014 |
| CN | 103646327 | A | 3/2014 |
| CN | 102610045 | B | 11/2014 |
| CN | 105160529 | A | 12/2015 |
| CN | 105282126 | A | 1/2016 |
| CN | 105608569 | A | 5/2016 |
| CN | 105659269 | A | 6/2016 |
| CN | 105678540 | A | 6/2016 |
| CN | 103634109 | B | 2/2017 |
| CN | 103634294 | B | 2/2017 |
| CN | 106878245 | A | 6/2017 |
| CN | 104065621 | B | 10/2018 |
| EP | 1744251 | A1 | 1/2007 |
| JP | 2013-239041 | A | 11/2013 |
| JP | 2015-506046 | A | 2/2015 |
| JP | 2016-525254 | A | 8/2016 |
| KR | 2000-0057247 | A | 9/2000 |
| KR | 1020130042006 | A | 4/2013 |
| KR | 2015-0092111 | A | 8/2015 |
| KR | 10-2016-0024185 | A | 3/2016 |
| KR | 2016-0048951 | A | 5/2016 |
| WO | 2015-101310 | A1 | 7/2015 |
| WO | 2016/079403 | A1 | 5/2016 |

OTHER PUBLICATIONS

Notice of Allowance for Japanese Application No. 2019-502236 dated Mar. 10, 2020.
Second Office Action of Chinese Application No. 20161056676.6 dated Feb. 3, 2020, (7 Pages).
Search Report for European Application No. 17830394.7 dated Jan. 27, 2020, (12 Pages).
First Search for Chinese Application No. 201610566676.6 dated Apr. 24, 2019, 1 page.
First Office Action for Chinese Application No. 201610566676.6 dated May 5, 2019, 16 pages.
First Office Action and First Search for Taiwanese Application No. 106118717 dated Nov. 27, 2018, 8 pages.
Office Action for Taiwanese Application No. 106118717 dated May 22, 2019, 5 pages.
Written Opinion of the International Searching Authority and International Search Report for International Application No. PCT/CN2017/092449 dated Oct. 10, 2017, 14 pages.
International Preliminary Report on Patentability for International Application No. PCT/CN2017/092449 dated Jan. 31, 2019, 11 pages.
First Examination Report for Indian Application No. 201947001721 dated Jan. 7, 2021.
Notice of Allowance for Korean Application No. 10-2019-7004499 dated Nov. 26, 2020.

* cited by examiner

METHOD AND DEVICE FOR PROVIDING AND OBTAINING GRAPHIC CODE INFORMATION, AND TERMINAL

CROSS-REFERENCE TO RELATED APPLICATIONS

The present application is a continuation application of International Patent Application No. PCT/CN2017/092449, filed on Jul. 11, 2017, which is based on and claims priority to the Chinese Patent Application No. 201610566676.6, filed on Jul. 18, 2016 and entitled "Method and Device for Providing and Obtaining Graphic Code Information, and Terminal." The above-referenced applications are incorporated herein by reference in their entirety.

TECHNICAL FIELD

The present application relates to the field of information processing technologies, and in particular, to a method, device, and a terminal for providing and obtaining graphic code information.

BACKGROUND

With the rapid development of mobile communication technologies and terminal technologies, a terminal can be installed with a variety of applications to provide increasingly abundant functions for a user. In related technologies, most applications would not provide sensitive graphic code information involved in the applications to other applications due to security concerns.

For example, in a payment application scenario like shopping, a user may quickly and conveniently make a payment operation by using an offline payment code supplied by the application Alipay. At present, Alipay has tremendous advantages over other Internet companies in terms of payment technologies using offline payment codes and in terms of the number of users. Therefore, all mobile terminal manufacturers would like to access the Alipay offline payment code function. In the process of providing an Alipay offline payment code to a mobile terminal manufacturer, however, a third party may steal the offline payment code, or intercept critical data generated from the Alipay offline payment code so as to counterfeit a similar graphic code.

SUMMARY

To overcome the problems in current technologies, the present application provides a method, device, and a terminal for providing and obtaining graphic code information.

According to a first aspect of some embodiments of the present application, a method for providing graphic code information is provided. The method is implementable by a device comprising a first module, a second module, and an interface module. The method comprises:

the second module verifying through the interface module whether the first module is a trusted module;

the second module receiving target user information through the interface module and verifying whether the target user information is in a logged-in state on the second module, wherein the target user information is pre-associated with the interface module; and after verifying that the first module is a trusted module and the target user information is in the logged-in state on the second module, the second module generating graphic code information and transmitting the graphic code information to the first module through the interface module.

In some embodiments, the second module verifying through the interface module whether the first module is a trusted module comprises: the second module sending encrypted session information to the first module through the interface module; the first module decrypting the encrypted session information and transmitting a decryption result to the second module; and the second module verifying, according to the decryption result, whether the first module is a trusted module.

In some embodiments, the session information comprises a randomly generated session key. In some embodiments, the first module decrypting the encrypted session information and transmitting a decryption result to the second module through the interface module comprises: the first module decrypting the encrypted session information, and if the first module successfully completes the decryption, the first module obtaining the session key and transmitting the session key obtained through the decryption to the interface module; and the interface module encrypting verification information and transmitting the encrypted verification information to the second module, wherein a key used by the interface module to encrypt the verification information is the session key obtained through the decryption by the first module.

In some embodiments, the second module verifying whether the first module is a trusted module according to the decryption result comprises: the second module receiving the verification information, and using the randomly generated session key for decryption, and if the decryption is successful, determining that the first module is a trusted module.

In some embodiments, the interface module encrypting verification information and transmitting the encrypted verification information to the second module comprises: the interface module encrypting the target user information and transmitting the encrypted target user information to the second module as the encrypted verification information.

In some embodiments, the second module generating graphic code information and transmitting the graphic code information to the first module through the interface module comprises: the second module generating the graphic code information; the second module using the randomly generated session key to encrypt the graphic code information and transmitting the encrypted graphic code information to the interface module; and the interface module receiving the encrypted graphic code information, decrypting the encrypted graphic code information, and transmitting the decrypted graphic code information to the first module, wherein the key used by the interface module to decrypt the encrypted graphic code information is the session key obtained through the decryption by the first module.

In some embodiments, the target user information is pre-associated with the interface module in the following steps: the first module initiating an association request to the second module through the interface module; the second module sending user identity authorization information, which is in a logged-in state, to the first module through the interface module; the first module sending the user identity authorization information, a public key preset in a Trusted Execution Environment (TEE), and a preset unique device identifier to a server corresponding to the second module through a server corresponding to the first module; and the first module receiving the target user information and transmitting the target user information to the interface module, wherein the target user information is transmitted by the server corresponding to the second module through the server corresponding to the first module after the server corresponding to the second module has verified the user identity authorization information to be correct.

According to a second aspect of some embodiments of the present application, a method for providing graphic code information is provided. The method is implementable by a third-party payment application and the method comprises:

verifying, through an interface module provided by the same party as the third-party payment application, whether a terminal payment application is trustworthy, wherein the third-party payment application, the interface module, and the terminal payment application are installed on the terminal;

receiving, through the interface module, target user information and verifying whether the target user information is in a logged-in state on the third-party payment application, wherein the target user information is pre-associated with the interface module; and after verifying that the terminal payment application is trustworthy and the target user information is in the logged-in state on the third-party payment application, generating graphic code information and transmitting the graphic code information to the terminal payment application through the interface module.

In some embodiments, verifying, through the interface module, whether the terminal payment application is trustworthy comprises: generating and encrypting session information; sending the encrypted session information to the terminal payment application through the interface module; receiving, through the interface module, a decryption result from decryption of the encrypted session information and returned by the terminal payment application; and verifying, according to the decryption result, whether the terminal payment application is trustworthy.

In some embodiments, a key used for encrypting the session information is a public key distributed by the terminal payment application in advance. In some embodiments, generating the session information comprises: randomly generating a session key as the session information. In some embodiments, verifying, according to the decryption result, whether the terminal payment application is trustworthy comprises: receiving encrypted verification information sent by the interface module, and decrypting the encrypted verification information using the randomly generated session key; and if the decryption is successful, determining that the terminal payment application is trustworthy.

In some embodiments, generating graphic code information and transmitting the graphic code information to the terminal payment application through the interface module comprises: after the graphic code information is generated, encrypting the graphic code information using the randomly generated session key, and transmitting the encrypted graphic code information to the terminal payment application through the interface module.

According to a third aspect of some embodiments of the present application, a method for providing graphic code information is provided. The method is implementable by the interface module and comprises:

receiving encrypted session information sent by the second module and transmitting the encrypted session information to the first module;

transmitting a decryption result obtained from decryption of the encrypted session information by the first module to the second module, for the second module to verify whether the first module is a trusted module according to the decryption result;

sending target user information, which is pre-associated with the interface module, to the second module, for the second module to verify whether the target user information is in a logged-in state on the second module; and receiving the graphic code information generated by the second module after the second module has verified that the first module is a trusted module and the target user information is in the logged-in state on the second module, and transmitting the graphic code information to the first module.

In some embodiments, the session information comprises a randomly generated session key. In some embodiments, transmitting a decryption result obtained from decryption of the encrypted session information by the first module to the second module comprises: receiving the session key obtained through the decryption and sent by the first module, the session key being obtained after the first module successfully decrypts the encrypted session information; and encrypting verification information using the session key obtained through the decryption, and transmitting the encrypted verification information to the second module.

In some embodiments, the graphic code information generated by the second module is graphic code information encrypted by the second module using the randomly generated session key. In some embodiments, transmitting the graphic code information to the first module comprises: receiving the encrypted graphic code information; and transmitting the graphic code information to the first module after decryption, wherein a key used for decrypting the encrypted graphic code information is the session key obtained through the decryption by the first module.

In some embodiments, encrypting verification information using the session key obtained through the decryption, and transmitting the encrypted verification information to the second module comprises: encrypting the target user information using the session key obtained through the decryption, and transmitting the encrypted target user information to the second module as the encrypted verification information.

In some embodiments, the graphic code information generated by the second module is graphic code information encrypted by the second module using the randomly generated session key. In some embodiments, transmitting the graphic code information to the first module comprises: receiving the encrypted graphic code information; and transmitting the graphic code information to the first module after decryption, wherein a key used for decrypting the encrypted graphic code information is the session key obtained through the decryption by the first module.

In some embodiments, encrypting verification information using the session key obtained through the decryption, and transmitting the encrypted verification information to the second module comprises: encrypting the target user information using the session key obtained through the decryption, and transmitting the encrypted target user information to the second module as the encrypted verification information.

According to a fourth aspect of some embodiments of the present application, a method for obtaining graphic code information is provided. The method is applied in the first module and comprises:

receiving encrypted session information sent by the second module through the interface module;

decrypting the encrypted session information, and transmitting a decryption result to the second module through the interface module, for the second module to verify whether the first module is a trusted module according to the decryption result;

receiving graphic code information provided by the second module through the interface module; the graphic code information being provided after the second module has verified that the first module is a trusted module and target user information pre-associated with the interface module is in a logged-in state on the second module.

According to a fifth aspect of some embodiments of the present application, a method for providing graphic code information is provided. The method is applied on a terminal comprising a terminal payment application, a third-party payment application, and an interface module, wherein the interface module corresponds to the third-party payment application. The method comprises:

the third-party payment application verifying through the interface module whether the terminal payment application is a trusted application;

the third-party payment application receiving target user information and verifying whether the target user information is in a logged-in state on the third-party payment application, wherein the target user information is pre-associated with the interface module; and after verifying that the terminal payment application is a trusted application and the target user information is in the logged-in state on the third-party payment application, the third-party payment application generating graphic code information and transmitting the graphic code information to the terminal payment application through the interface module.

According to a sixth aspect of some embodiments of the present application, a device for providing graphic code information is provided. The device is applied on a terminal comprising an interface apparatus and a first apparatus, and the device comprises:

a trustworthiness verifying module configured to verify, through the interface apparatus, whether the first apparatus is a trusted apparatus;

a user information verifying module configured to receive target user information through the interface apparatus and verify whether the target user information is in a logged-in state on a second apparatus, wherein the target user information is pre-associated with the interface apparatus; and an information transmitting module configured to generate graphic code information and transmit the graphic code information to the first apparatus through the interface apparatus after it has been verified that the first apparatus is a trusted apparatus and the target user information is in the logged-in state on the second apparatus.

According to a seventh aspect of some embodiments of the present application, a device for providing graphic code information is provided. The device is applied on a terminal comprising a first apparatus and a second apparatus, and the device comprises:

an encrypted session information receiving module configured to receive encrypted session information sent by the second apparatus and transmit the encrypted session information to the first apparatus;

a decryption result transmitting module configured to transmit a decryption result obtained from decryption of the encrypted session information by the first apparatus to the second apparatus, for the second apparatus to verify whether the first apparatus is a trusted apparatus according to the decryption result;

a user information sending module configured to send pre-associated target user information to the second apparatus, for the second apparatus to verify whether the target user information is in a logged-in state on the second apparatus; and a graphic code information receiving module configured to receive the graphic code information generated by the second apparatus and transmit the graphic code information to the first apparatus after it has been verified that the first apparatus is a trusted apparatus and the target user information is in a logged-in state on the second apparatus.

According to an eighth aspect of some embodiments of the present application, a device for obtaining graphic code information is provided. The device is applied on a terminal comprising an interface apparatus and a second apparatus, and the device comprises:

an encrypted session information receiving module configured to receive encrypted session information sent by the second apparatus through the interface apparatus;

a decryption module configured to decrypt the encrypted session information, and transmit a decryption result to the second apparatus through the interface apparatus, for the second apparatus to verify whether the first apparatus is a trusted apparatus according to the decryption result; and a graphic code information receiving module configured to receive the graphic code information provided by the second apparatus through the interface apparatus; the graphic code information being provided after the second apparatus has verified that the first module is a trusted apparatus and target user information pre-associated with the interface apparatus is in a logged-in state on the second apparatus.

According to a ninth aspect of some embodiments of the present application, a terminal is provided, comprising:

a processor and a memory coupled to the processor and storing instructions executable by the processor to cause the processor to:

verify, by a second module through an interface module, whether a first module is a trusted module;

receive, by the second module, target user information and verify, by the second module, whether the target user information is in a logged-in state on the second module, wherein the target user information is pre-associated with the interface module; and generate, by the second module, graphic code information after verifying that the first module is a trusted module and the target user information is in the logged-in state on the second module, and transmit, by the second module, the graphic code information to the first module through the interface module.

The technical solutions provided in the embodiments of the present application can achieve the following advantageous effects:

According to an exemplary solution in the embodiments of the present application, when a user requests to access, by a first module, graphic code function of a second module, the second module performs security verification on the first module, and at the same time, performs security verification on a user of the second module already associated with the first module. When both pass the security verification, the graphic code information is provided to the first module. Accordingly, the security of the process for providing graphic code information is ensured, thereby preventing the graphic code information from being stolen or intercepted.

It should be understood that the general description above and detailed description below are only exemplary and explanatory, and shall not limit the present application.

BRIEF DESCRIPTION OF THE DRAWINGS

The accompanying drawings herein are incorporated into the description and constitute a part of the description. The accompanying drawings illustrate some embodiments that are consistent with the present application and are used along with the description to explain principles of the present application.

DETAILED DESCRIPTION

Exemplary embodiments will be described in detail below, and the examples thereof are illustrated in the accompanying drawings. When the description below involves the accompanying drawings, identical numerals in different figures represent identical or similar elements, unless otherwise indicated. The implementation manners described in the exemplary embodiments below do not represent all implementation manners consistent with the present application. Conversely, these implementation manners are merely examples of devices and methods consistent with some aspects of the present application that are described in detail in the appended claims.

Terms used in the present application are intended only for description of some embodiments, instead of limiting the present application. "One," "the," and "that" in singular form used in the present application and the appended claims are also intended to include the plural form thereof, unless other meanings are clearly indicated in the context. It should also be understood that the term "and/or" used herein refers to and comprises any or all possible combinations of one or more associated items that are listed.

It should be understood that terms such as first, second, third, and the like may be used in the present application to describe various information; however, the information shall not be limited to these terms. These terms are only used to differentiate information of the same type. For example, the first information may also be referred to as the second information, and similarly, the second information may also be referred to as the first information, provided that the change does not depart from the scope of the present application. Depending on the context, the word "if" used herein can be interpreted as "when," "at the moment when," or "in response to a determination of."

The solutions provided by embodiments of the present application can be applied to a smart terminal, such as a smart phone, a smart watch, smart glasses, a tablet computer, a Walkman device, etc. A terminal can be installed with a variety of applications to provide increasingly abundant functions for a user. In related technologies, most applications would not provide sensitive graphic code information involved in the applications to other applications due to security concerns. The solutions provided by embodiments of the present application enable a data supplier to safely transmit graphic code information to a data receiver.

Figure 1:
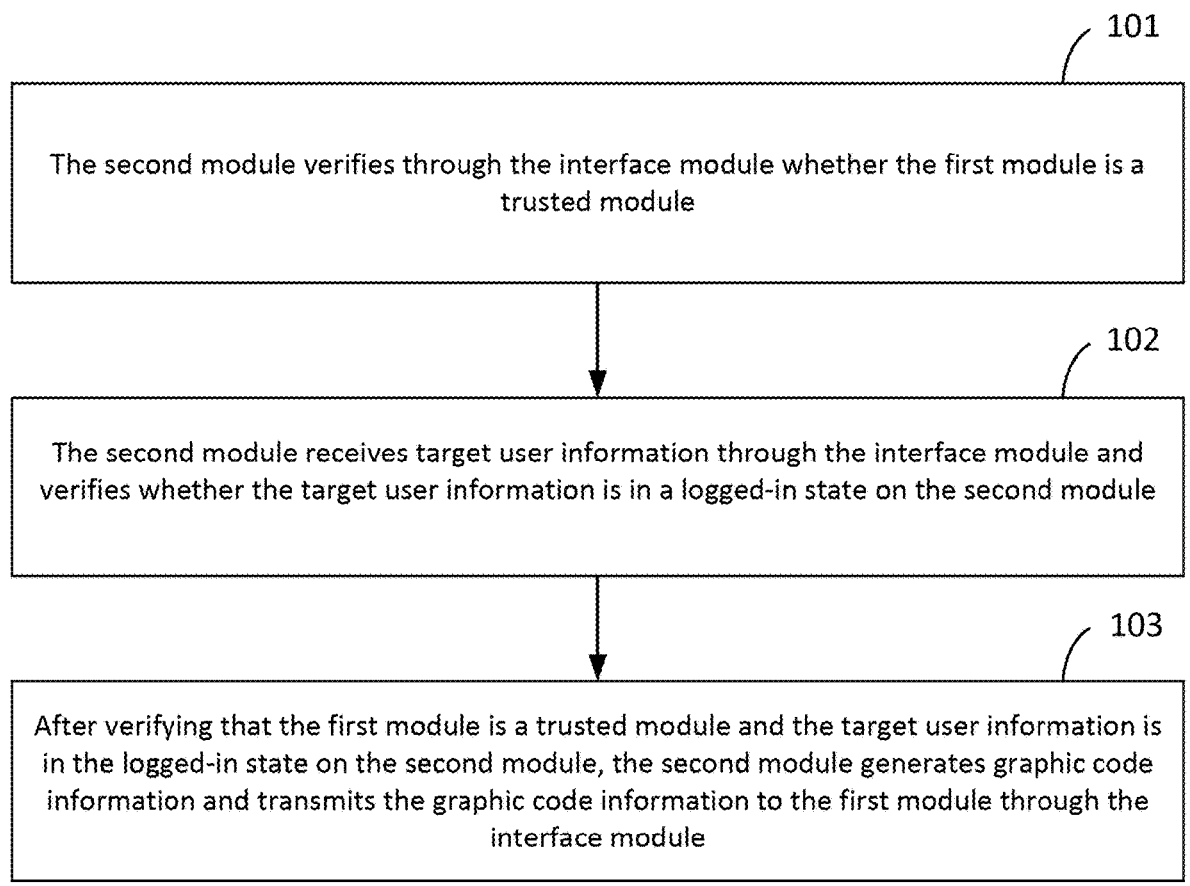
FIG. 1 is a flow chart of a method for providing graphic code information according to some embodiments of the present application.

FIG. 1 is a flow chart of a method for providing graphic code information according to some embodiments of the present application. The method is applied in a device comprising a first module, a second module, and an interface module, wherein the interface module corresponds to the second module. The method comprises the steps 101 to 103 as follows:

In step 101, the second module verifies through the interface module whether the first module is a trusted module.

In step 102, the second module receives target user information through the interface module and verifies whether the target user information is in a logged-in state on the second module, wherein the target user information is pre-associated with the interface module.

In step 103, after verifying that the first module is a trusted module and the target user information is in the logged-in state on the second module, the second module generates graphic code information and transmits the graphic code information to the first module through the interface module.

The device in some embodiments of the present application can run on a smart terminal, such as a smart phone, a tablet computer, a Walkman device, a personal computer, a portable device, etc. The first module may refer to a graphic code information receiver, and the second module may refer to a graphic code information supplier. The first module and the second module may be two different applications independently running on the device. Since the second module provides the graphic code information to the first module, the interface module may correspond to the second module and be used for secure communication between the second module and the first module.

Since the second module provides graphic code information to the first module, the first module and the second module may perform data interaction. Assuming that the first module and the second module are manufactured by different made and that the first module and the second module perform data interaction directly, then the first module and the second module may disclose an information transmission protocol to each other, so as to carry out the process of providing and processing the graphic code information. However, the disclosure of information transmission protocols will weaken the security. Therefore, an interface module is used in the embodiments to carry out the interaction process between the first module and the second module. The interface module may be provided by the manufacturer of the second module to the first module, and the detailed functions of the interface module are provided by the manufacturer of the second module. Thus, the manufacturer of the second module may not need to disclose too much information about the data transmission protocol to the first module. After the interface module is provided to the first module, the first module can integrate the interface module as a sub-module for interaction with the second module, thereby reducing the cost and difficulty of development by the manufacturer of the first module.

Before the second module sends graphic code information to the first module, the second module may perform security verification, through the interface module, on the first module and user information associated with the first module. After verifying that the first module is a trusted module and the target user information is in a logged-in state on the second module, the second module generates graphic code information and transmits the graphic code information to the first module through the interface module.

Here, the verification by the second module that the first module is a trusted module is to determine that the first module is a trusted module pre-set by the second module, so as to prevent other untrusted modules from initiating a graphic code information obtaining request to the second module and thus prevent the second module from providing the graphic code information to the untrusted modules. Since the graphic code information involves sensitive user information, whether the user information associated with the second module is in a logged-in state on the second module can be further verified. Here, the target user information can be information capable of uniquely differentiating the user from other users, such as user account number, user identifier, etc. The format of user information can be flexibly set up in an exemplary application, which is not limited by the embodiments. If the user information in a logged-in state on the second module does not match the user information associated with the second module, it indicates that the users currently using the first module and the second module may not be the same, and then the security verification failed, thereby preventing the graphic code information from being provided to other users and ensuring the security of the graphic code information.

In an exemplary application, a variety of manners may be used to verify whether the first module is a trusted module. For example, the first module and the second module may agree on some self-defined identification information (e.g., some password strings, a unique identifier of the first module, or some self-defined character strings, etc.) in advance. When the second module performs verification, the interface module can obtain the identification information stored in the first module and provide the identification information to the second module for checking, and the second module determines whether the first module is a trusted module according to a checking result. Moreover, when providing the identification information to the second module, the interface module can also perform security processing on the identification information, such as encryption, to further enhance the data transmission security. In other optional implementation manners, a key may be agreed on by the first module and the second module in advance, and the interface module can provide data encrypted by the first module to the second module for decryption. If the decryption is successful, it can be determined that the first module is a trusted module; alternatively, the second module may provide encrypted data to the first module for decryption. If the decryption is successful, it can be determined that the second module is a trusted module.

In an optional implementation manner, the second module verifying, through the interface module, whether the first module is a trusted module comprises:

sending, by the second module, encrypted session information to the first module through the interface module;

decrypting the encrypted session information and transmitting a decryption result to the second module by the first module, and verifying, by the second module according to the decryption result, whether the first module is a trusted module.

The data transmission security can be enhanced through the above manner of encrypting the session information. Here, when the first module is produced by a manufacturer of a smart terminal, the key used by the first module to decrypt the encrypted session information can be a private key preset in a secure storage area, and the key used by the second module to encrypt the session information can be a public key distributed by the first module in advance. The terminal in the embodiments may be a terminal pre-configured with a Trusted Execution Environment (TEE). TEE refers to an area custom-made by a terminal manufacturer for a client device to safely store data and execute programs. TEE provides an independent execution environment that runs in parallel to a device operating system and can be used to store keys, authentication and certificates, execute important content protection software on the device, execute core content protection functions, and the like. The terminal manufacturer in the embodiments can preset asymmetric keys (public key and private key) in a TEE for the first module. When the first module associates with user information of the second module, the first module can distribute the public key to the second module. The public key and the private key are preset in the terminal TEE, making it relatively difficult to crack the keys and ensuring the secure storage of the keys.

In the exemplary embodiment, the public key and the private key are used for data encryption, i.e., encryption with asymmetric keys are used, which has relatively high security. Encryption with asymmetric keys refers to an encryption manner in which different keys are used for encryption and decryption. Two keys may be used, a public key and a private key. If the public key is used to encrypt data, decryption can be performed only with the corresponding private key. For example, Party A generates a pair of keys and discloses one of the keys as a public key to Party B; upon obtaining the public key, Party B uses the key to encrypt confidential information and then sends the encrypted confidential information to Party A; Party A then uses the private key stored by itself to decrypt the encrypted information.

Since the first module is to hold the private key and the second module is to hold the public key, the public key can be distributed by the first module to the second module in advance. When a third-party payment application sends session information encrypted using the public key, a terminal payment application can be determined to be a trusted application if the private key of the terminal payment application can be used to decrypt the encrypted information.

In an optional implementation manner, the session information comprises a randomly generated session key.

The first module decrypting the encrypted session information and transmitting a decryption result to the second module through the interface module comprises:

decrypting, by the first module, the encrypted session information, if the first module successfully completes the decryption, obtaining a decrypted session key, and transmitting, by the first module, the session key obtained through the decryption to the interface module.

The interface module encrypts verification information and transmits the encrypted verification information to the second module, wherein the key used by the interface module to encrypt the verification information is the session key obtained through the decryption by the first module.

The second module verifying whether the first module is a trusted module according to the decryption result comprises:

the second module receiving the encrypted verification information, and using the randomly generated session key for decryption; if the decryption is successful, determining that the first module is a trusted module.

The data encrypted using the public key by the second module is transmitted to the first module, and the second module obtains the decryption result from the decryption by the first module using the private key. On the other hand, the security needs to be ensured for the process in which the decryption result is transmitted to the second module through the interface module, so as to prevent malicious software from cracking the decryption result. In the exemplary embodiment, when the second module uses the public key to encrypt session information, a session key may be randomly generated and used as the session information, and the public key is used to encrypt the session key. The session key refers to encryption and decryption keys with a time limit that are randomly generated for a secure communication session between two parties of the session. If the first module successfully completes the decryption, a decrypted session key will be obtained, and the interface module can use the session key to encrypt verification information and transmit the encrypted verification information to the second module. Here, a format of the verification information can be flexibly set up according to actual needs. The purpose of this step is to encrypt information using the session key obtained through the decryption by the first module, such that the second module can receive the encrypted verification information sent by the interface module, and use the randomly pre-generated session key for decryption. If the decryption is successful, it can be determined that the first module is a trusted module. With the session key, it can be accurately detected whether the first module can use a pre-agreed key for successful decryption, and the security of decryption result transmission can also be ensured.

It can be seen from the description above that the process of security verification performed by the second module on the first module comprises a process of verifying whether the target user information pre-associated with the first module is in a logged-in state on the second module. In the process of performing this verification, the first module may transmit the pre-associated user information to the second module, and to ensure the security of the user information transmission in this process, the interface module may encrypt the user information and transmit the encrypted user information to the second module.

In an optional implementation manner, to reduce process flows and accelerate the verification by the second module, the interface module encrypting verification information and transmitting the encrypted verification information to the second module can comprise:

after the interface module encrypts the target user information, the interface module transmits the encrypted target user information to the second module as the encrypted verification information.

In the exemplary embodiment, when sending a decryption result of the first module to the second module, the interface module can use the target user information as the verification information and encrypt the verification information using the session key, and then transmit the encrypted verification information to the second module. On one hand, this achieves encryption of the target user information when transmitting the target user information, and on the other hand, this reduces the process flows. For the second module, the second module can simultaneously verify whether the first module successfully completes the decryption and verify the target user information.

After verifying that the first module is a trusted module and the target user information is in a logged-in state on the second module, the second module can generate graphic code information and transmit the graphic code information to the first module through the interface module. In the process of transmitting the graphic code information, the second module can encrypt the graphic code information and then transmit the encrypted graphic code information.

In an optional implementation manner, the session information can further comprise a random code. The second module can generate a random code and use the public key to send the session key and the random code to the interface module. After the first module successfully completes the decryption, the session key and the random code are obtained. When the interface module uses the session key to encrypt the target user information, the interface module can use the session key to encrypt the target user information and the random code. In some embodiments of the present application, the session key may further comprise a random code that is randomly generated, and the second module can verify whether the random code returned by the interface module is consistent with the random code that is randomly generated, thereby preventing re-entry requests and further ensuring the security of data transmission.

Here, generating graphic code information and transmitting the graphic code information to the first module through the interface module can comprise:

after the second module generates the graphic code information, the second module uses the randomly generated session key to encrypt the graphic code information and transmits the encrypted graphic code information to the interface module.

The interface module receives the encrypted graphic code information, decrypts the encrypted graphic code information, and transmits the decrypted graphic code information to the first module; here, the key used by the interface module to decrypt the encrypted graphic code information is the session key obtained through the decryption by the first module.

In the exemplary embodiment, the session key can be used for encryption during the process of transmitting the graphic code information, so as to ensure the security of the graphic code information transmission process.

In an exemplary application, the generating graphic code information can be generated through a pre-distributed one-time password seed. Here, the one-time password seed can be used to generate a random number combination at every 60 seconds according to a special algorithm, where the random number combination is time-related and unpredictable. Each password can be used only once, thereby ensuring that the graphic code information can be used only once, and limiting the effectiveness of the graphic code information. Accordingly, the secure use of the graphic code information can be effectively protected.

At this point, by implementing the solutions provided by some embodiments of the present application, when a user requests to access graphic code function of the second module, the first module can utilize the interface module which securely accesses graphic code information of the second module and quickly provides the graphic code information to the first module, such that the first module can quickly obtain the graphic code information.

The embodiments above describe the process of the first module obtaining graphic code information provided by the second module. In an optional implementation manner, before the second module provides a graphic code to the first module, the first module can request the access to the graphic code information from the second module to achieve association with target user information. The process of the first module pre-associating with the target user information will be described below.

In the exemplary embodiment, the target user information and the interface module can be pre-associated in the following manner:

the first module initiates an association request to the second module through the interface module;

the second module sends user identity authorization information in a logged-in state to the first module through the interface module;

the first module sends the user identity authorization information, a public key preset in a TEE, and a preset unique device identifier to a server corresponding to the second module through a server corresponding to the first module; and the first module receives the target user information and transmits the target user information to the interface module, wherein the target user information is transmitted by the server corresponding to the second module through the server corresponding to the first module after the server corresponding to the second module has verified the user identity authorization information to be correct.

In some embodiments of the present application, OAuth (Open Authorization) is a secure, open, and simple standard defined for authorization of user resources. A third party can obtain a user's authorization information, i.e., the user identity authorization information, without knowing the account number and password of the user. The user identity authorization information can be generated by the server corresponding to the second module after the server corresponding to the second module verifies the user account and account password input by the user through the second module to be correct.

A terminal payment application requests the user identity authorization information of the second module, and then can send the user identity authorization information, the public key, and a unique identifier of the terminal to the server corresponding to the second module in a secure manner. The server corresponding to the second module can verify that the user identity authorization information sent by the second module is consistent with the user identity authorization information generated previously, and then store the user identity authorization information, the public key, and the unique device identifier, thereby establishing an association between the first module, the public key and the user of the second module.

The first module can send to the second module a graphic code enabling authorization request that carries the unique device identifier. Based on the graphic code enabling authorization request, the second module can request, from the server corresponding to the second module, the public key distributed by the first module. Upon receiving the enabling authorization request, the server corresponding to the second module verifies that the user identity authorization information is correct, and then distributes a public key corresponding to the unique device identifier to the second module by using the stored user identity authorization information, public key, and unique device identifier. At the same time, the server corresponding to the second module can send a one-time password seed used for generating graphic code information, thereby enabling the first module to access the graphic code function of the second module for the currently logged-in user.

The solution according to some embodiments of the present application can be applied in most scenarios where graphic codes involving sensitive user information is to be provided. For example, in a payment application scenario, a third-party payment application can provide a payment code to a terminal payment application, and the payment code can be quickly and conveniently called through the terminal payment application, such that the user can rapidly perform the payment operation. In another example, in a social application scenario, a social application provides graphic code of user information to other applications, and the other applications can quickly and conveniently call the graphic code, such that the user can rapidly perform operations such as "Add a Friend."

Subsequently, the application of the solution according to the present application in a payment scenario will be used as an example for detailed description below. Here, in the exemplary embodiment shown in FIG. 1, the first module can be the terminal payment application and the second module can be the third-party payment application.

At present, more and more smart terminal manufacturers have introduced payment applications, such as Apple Pay by Apple, Inc., Samsung Pay by Samsung Electronics, Huawei Pay by Huawei, and the like. The terminal payment applications of these terminal manufacturers can be bundled with a user's bank card in advance. When the user makes a payment and no matter what state the terminal is in, e.g., a lock screen state, a blank screen state, or a home screen state, the user may not need to look for and activate the application, but simply follows preset operations. For example, by inputting an up-sliding track at the bottom of the screen, the payment function of the terminal payment application can be called, and the payment operation is carried out through near-field communication with a POS machine.

According to conventional technologies, a third-party payment application may also be installed on a smart terminal, and transaction payment operations can be carried out through a third-party payment application. Take Alipay as an example, when a user makes a payment to a merchant, the payment code function provided by Alipay can be used to display a payment two-dimensional code in the application interface. The payment two-dimensional code typically carries encrypted user information, and the merchant can scan the payment two-dimensional code with a scanner to carry out the payment operation.

Due to the tremendous number of users of third-party payment applications and the convenient operations of payment code payments, more and more terminal manufacturers want to access the Alipay offline payment code function. In the process to provide an Alipay offline payment code to a mobile terminal manufacturer, however, a third party may steal the offline payment code, or intercept critical data generated by the Alipay offline payment code to counterfeit a similar graphic code.

With the solution for providing graphic code information provided in some embodiments of the present application, a third-party payment application can perform security verification on a terminal manufacturer application that initiates a payment code request, and at the same time, perform security verification on a third-party payment application user already associated with the terminal manufacturer application. When both the terminal manufacturer application and the user pass the security verification, the graphic code information is provided to the terminal manufacturer application. Therefore, the security of the process to provide the graphic code can be ensured, preventing the payment code from being stolen or intercepted.

The terminal in the exemplary embodiment can be installed with a terminal payment application and a third-party payment application. A user can log in the terminal server through the terminal payment application based on a first account. After inputting the account and password and successfully logging in the terminal server, the user can obtain functions provided by the terminal server through the terminal payment application. The user can also log in a third-party payment server through the third-party payment application based on a second account. After inputting the account name and password and successfully logging in the third-party payment server, the user can obtain functions provided by the third-party payment server through the third-party payment application.

Here, the terminal in the exemplary embodiment of the present application is a terminal pre-configured with TEE. The terminal manufacturer in the exemplary embodiment can preset asymmetric keys (public key and private key) in the TEE to be used in data encryption for the terminal payment application.

Figure 2A:
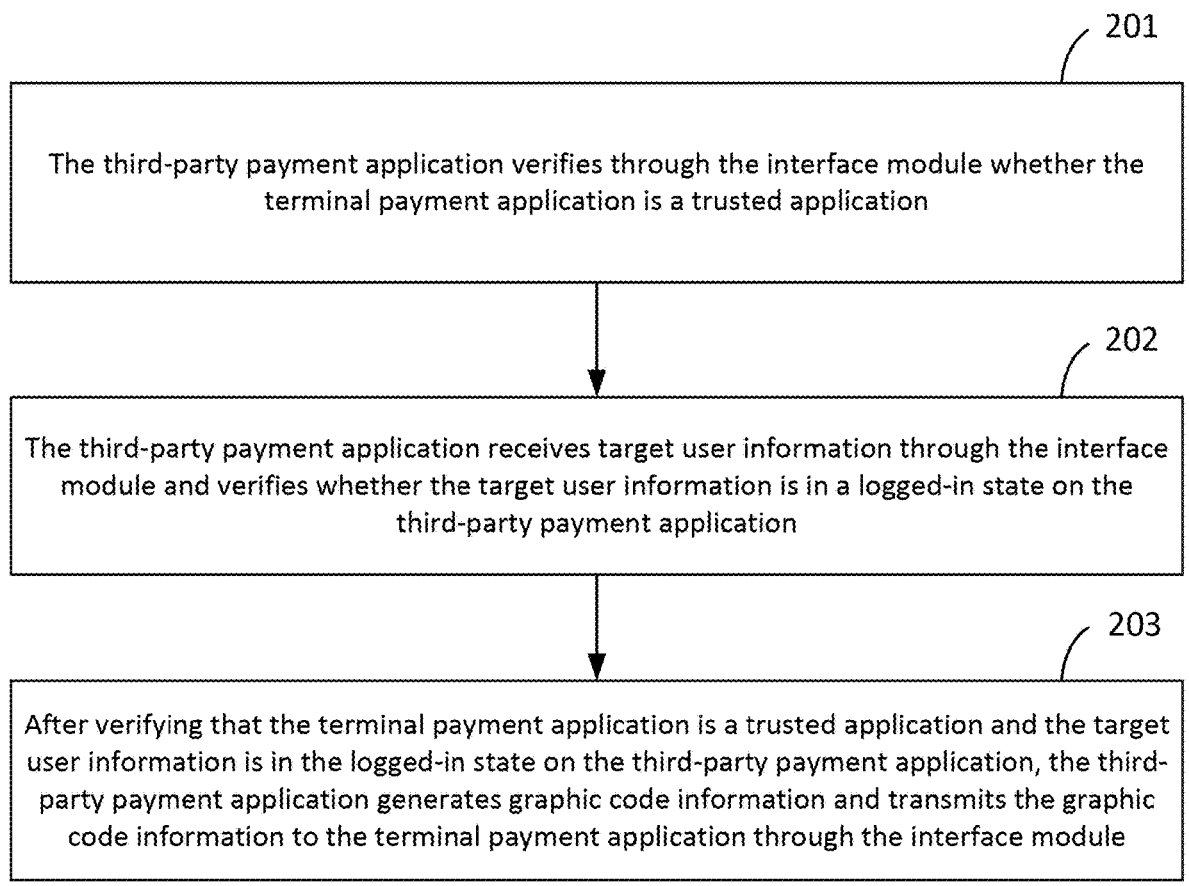
FIG. 2A is a flow chart of a method for providing graphic code information according to some other embodiments of the present application.
Figure 2B:
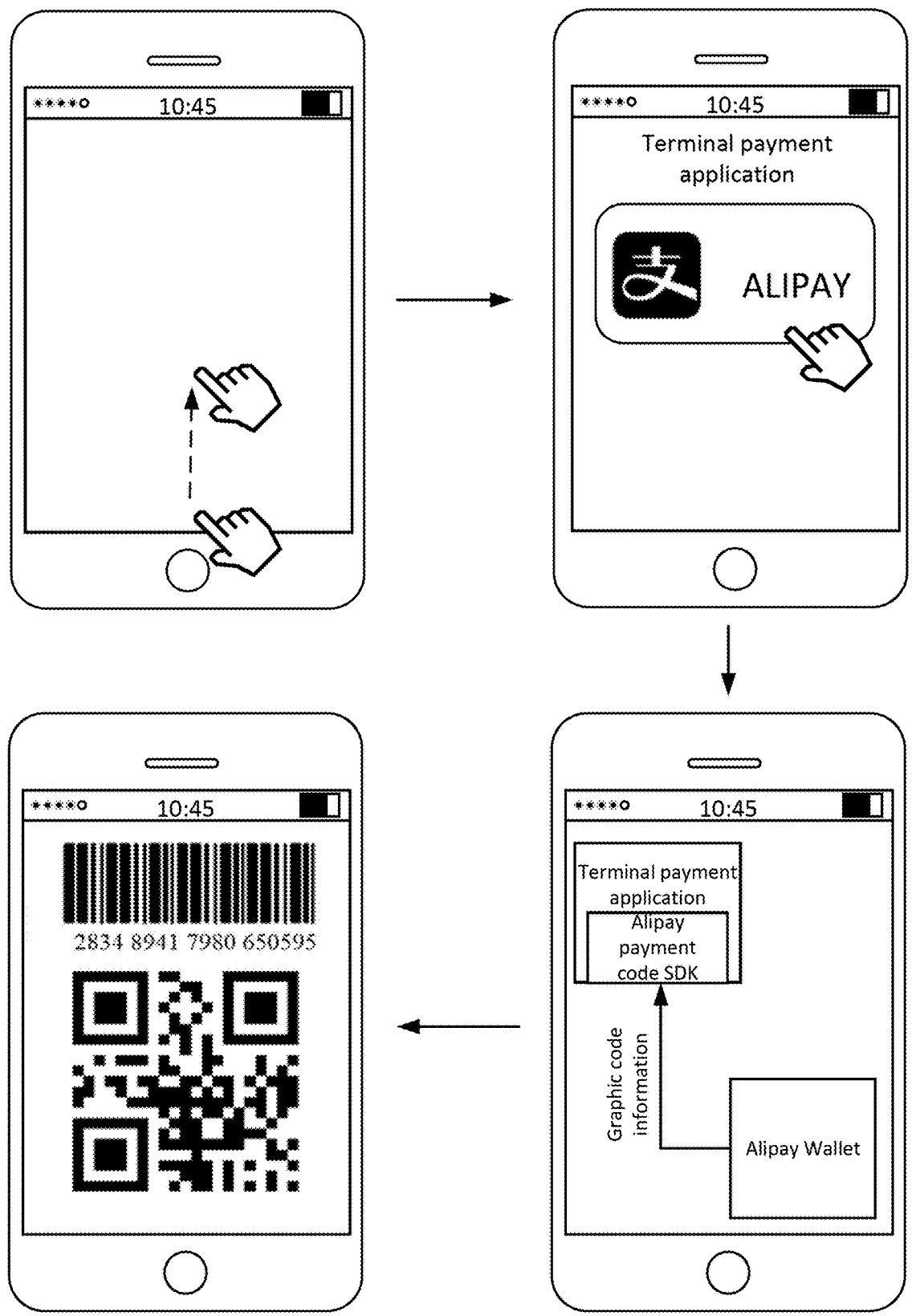
FIG. 2B is a schematic diagram of an application scenario of a method for providing graphic code information according to some embodiments of the present application.

The solution for providing graphic code information of the exemplary embodiment will be described in detail with reference to FIG. 2A and FIG. 2B. FIG. 2A is a flow chart of a method for providing graphic code information according to some other embodiments of the present application, and FIG. 2B is a schematic diagram of an application scenario of a method for providing graphic code information according to some embodiments of the present application. FIG. 2B illustrates a smart phone as the terminal, a third-party payment application, and a payment application produced by the terminal manufacturer. The smart phone is provided with TEE, and the phone manufacturer presets a public key and a private key in TEE. A service provider of the third-party payment application can develop relevant programs in advance and package the programs into a Software Development Kit SDK, which is provided to the terminal manufacturer. The terminal manufacturer can integrate the SDK as a sub-module in the terminal payment application, and the SDK will interact with the third-party payment application as a sub-module of the terminal payment application. In the exemplary embodiment, the sub-module is referred to as an interface module. It can be understood that in other optional implementation manners, the terminal may also be a device such as a tablet computer, a smart wristband, smart glasses, etc., and the third-party payment application may comprise common applications such as WeChat Pay, Baidu Wallet, etc. The method comprises the steps 201 to 203 as follows:

In step 201, the third-party payment application verifies through the interface module whether the terminal payment application is a trusted application.

In step 202, the third-party payment application receives target user information through the interface module and verifies whether the target user information is in a logged-in state on the third-party payment application, wherein the target user information is pre-associated with the interface module.

In step 203, after verifying that the terminal payment application is a trusted application and the target user information is in the logged-in state on the third-party payment application, the third-party payment application generates graphic code information and transmits the graphic code information to the terminal payment application through the interface module.

In the exemplary embodiment, the terminal can be installed with a terminal payment application and a third-party payment application. A user can log in the terminal server through the terminal payment application based on a first account. After inputting the account and password and successfully logging in the terminal server, the user can obtain functions provided by the terminal server through the terminal payment application. The user can also log in a third-party payment server through the third-party payment application based on a second account. After inputting the account name and password and successfully logging in the third-party payment server, the user can obtain functions provided by the third-party payment server through the third-party payment application.

Here, the terminal in the exemplary embodiment of the present application is a terminal pre-configured with TEE. The terminal manufacturer can preset asymmetric keys (public key and private key) in TEE to be used in data encryption during a payment process for the terminal payment application.

In the exemplary embodiment, the terminal manufacturer application can invoke, as instructed by the user, the interface module to initiate a payment code generating request to the third-party payment application. The terminal manufacturer application can be bundled with an account of a user of the third-party payment application in advance. When the user requests to obtain a payment code of the third-party payment application through the terminal manufacturer application, a preset operation can be followed. For example, as shown in FIG. 2B, the user can input an up-sliding track at the bottom of the screen, and the payment function of the terminal payment application can be called. The user then can select a third-party payment application for payment.

In the exemplary embodiment, the third-party payment application can perform security verification on the terminal payment application to determine that the terminal payment application is a trusted application to the third-party payment application. In some implementation, encryption with asymmetric keys can be used with the terminal payment application holding the private key and the third-party payment application holding the public key. The third-party payment application encrypts session information using the public key and transmits the encrypted session information to the terminal payment application through the interface module. If the encrypted session information can be decrypted by the private key of the terminal payment application, it can be determined that the terminal payment application is a trusted application. Here, the terminal payment application can be pre-associated with the user of the third-party payment application, and after successful association, distribute the public key in TEE to the third-party payment application.

The reason to adopt the manner in which the terminal payment application holds the private key and the third-party payment application holds the public key is because the public key and the private key are preset in TEE of the terminal, which can ensure the secure storage of the public key and the private key. In the exemplary embodiment, public keys and private keys preset by different terminals are different. Moreover, since a terminal payment application is developed by a terminal manufacturer, the terminal payment application has permission to read the public key or the private key in TEE.

A third-party payment application is typically a third-party payment application APP provided by a third-party payment service provider for users to download. A user can install the downloaded APP in a terminal. Assuming that the third-party payment application provides a public key and a private key and that an algorithm is preset in the APP to generate the public key and the private key, the generated public key and private key cannot be safely stored since the APP is installed in a public storage environment of the terminal, and it would be easy for other malicious applications to attack or crack. Therefore, the storage of the public key and the private key in the terminal TEE and the provision of the public key by the terminal payment application to the third-party payment application can ensure the secure storage of the keys.

The public key can be distributed by the terminal payment application to the third-party payment application in advance. When the third-party payment application transmits the session information encrypted with the public key to the terminal payment application and if the encrypted session information can be decrypted by the private key of the terminal payment application, it can be determined that the terminal payment application is a trusted application.

The terminal payment application can be in the TEE and decrypts the encrypted session information using the private key preset in TEE. Since the private key is held by the terminal payment application, the terminal payment application uses the private key to decrypt the session information encrypted with the public key and sent by the third-party payment application and provide the result of decryption to the third-party payment application, enabling the third-party payment application to determine whether the terminal payment application is a trusted application. In the process of notifying the third-party payment application, the decryption result may also be transmitted in an encryption manner.

In the exemplary embodiment, the session information encrypted by the third-party payment application using the public key can comprise a randomly generated session key. If the terminal payment application successfully decrypts the session information using the private key, the session key can be obtained, and the interface module can use the session key to encrypt the target user information pre-associated with the terminal payment application and return the encrypted target user information to the third-party payment application.

The third-party payment application receives the target user information encrypted using the session key. On one hand, if the third-party payment application uses the previously randomly generated session key for successful decryption, it is indicated that the terminal payment application uses the private key to successfully decrypt the session information encrypted using the public key, and therefore, it can be determined that the terminal payment application is a trusted application; on the other hand, the session key ensures the security of this session between the two applications. Moreover, the session key encrypts the target user information that has already been associated with the terminal payment application, then the third-party payment application can use the target user information to determine if the target user information is in a logged-in state on the third-party payment application, and the third-party payment application can perform security verification on the user account already bundled to the terminal payment application.

After the security verification on both the terminal payment application and the user bundled to the terminal payment application passes, the third-party payment application can generate a payment code, use the session key to encrypt the payment code, and transmit the encrypted payment code to the interface module, so as to ensure the security of the payment code transmission process. The interface module can receive the payment code encrypted using the session key, use the session key for decryption, and provide the obtained payment code to the terminal payment application for display.

At this point, by implementing the solution according to some embodiments of the present application, the interface module can safely access the payment code of the third-party payment application when the user requests to access the payment code function of the third-party payment application, and quickly provide the payment code to the terminal payment application, such that the terminal payment application can quickly display the payment code as shown in FIG. 2B in the application interface for the user to quickly complete the payment operation.

Figure 2C:
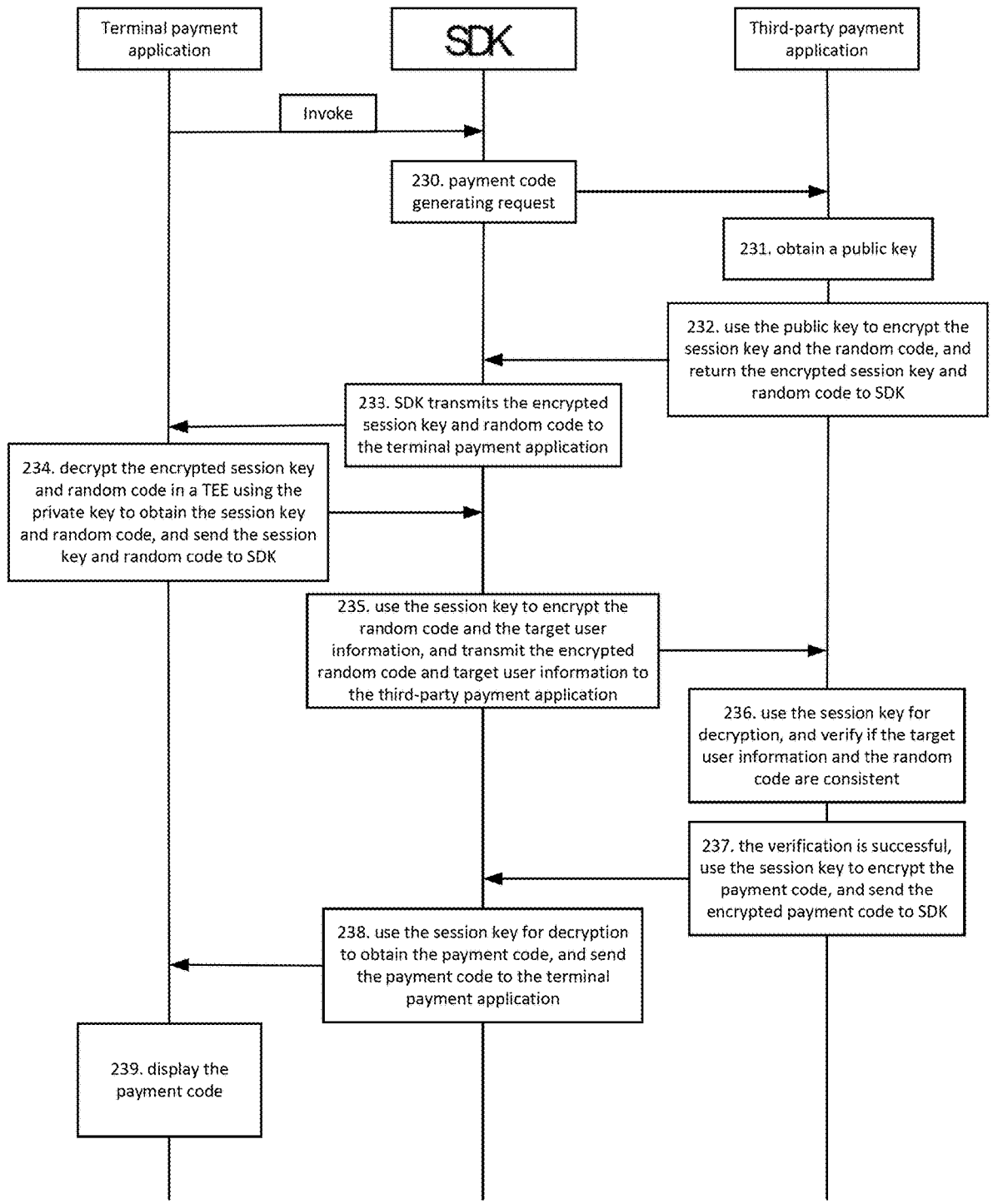
FIG. 2C is a flow chart of a method for providing graphic code information according to some other embodiments of the present application.
Figure 2D:
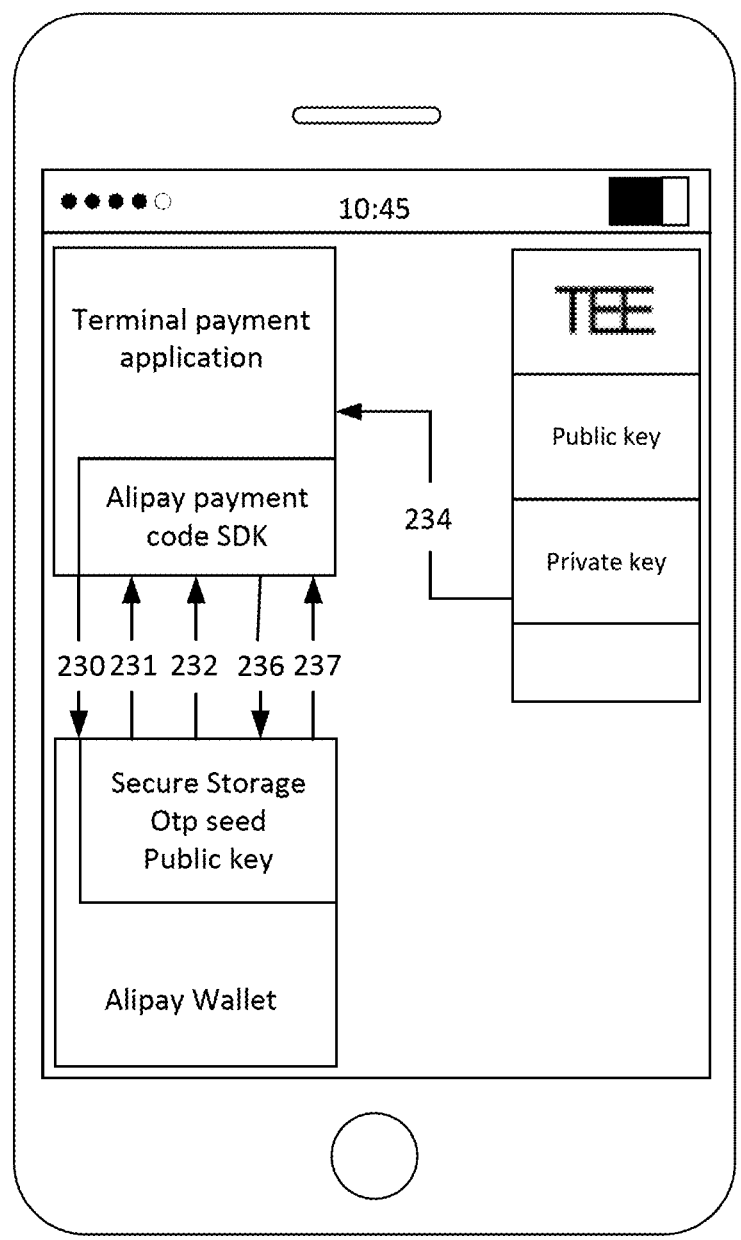
FIG. 2D is a flow chart of a method for providing graphic code information according to some other embodiments of the present application.

On the basis of the exemplary embodiment shown in FIG. 2B, another exemplary embodiment will be provided below to explain the solution according to the present application. A flow chart of the method for providing graphic code information according to the present application is shown in FIG. 2C and FIG. 2D. In the exemplary embodiment, take the third-party payment application being Alipay Wallet as an example, and the method comprises:

Step 230, the terminal payment application invokes the barcode generating interface of the Alipay payment code SDK, and the SDK initiates a payment code generating request to Alipay Wallet.

Step 231, Alipay Wallet receives the payment code generating request, and obtains, according to a user account of the currently logged-in user, a public key corresponding to the user account.

Here, the public key is provided by the terminal server to the third-party payment server, and distributed by the third-party payment server to Alipay Wallet for secure storage. In an exemplary application, when distributing the public key, the third-party payment server encrypts the public key in an encryption manner pre-agreed upon with Alipay Wallet, and Alipay Wallet can store the encrypted public key. When the public key is to be used, the public key can be decrypted in a decryption manner agreed upon in advance.

Step 232, Alipay Wallet randomly generates a session key "sessionKey" and a random code "challenge," uses the public key obtained in Step 231 to encrypt "sessionKey" and "challenge," and transmits the encrypted "sessionKey" and "challenge" to SDK.

Here, the encryption using the public key is to ensure the security of data transmission and to perform security verification on the terminal payment application. The session key is provided to SDK at the current request and can be further used for subsequent decryption of the payment code to ensure the security of the payment code.

Step 233, SDK transmits the encrypted "sessionKey" and "challenge" to the terminal payment application.

Step 234, the terminal payment application decrypts the received encrypted "sessionKey" and "challenge" in a TEE using the private key preset in the TEE; if the decryption is successful, the terminal payment application returns the decrypted "sessionKey" and "challenge" and a pre-stored user account (userID) to SDK.

Here, the pre-stored user account is a user account with the payment code access function of the terminal manufacturer application enabled.

Step 235, SDK uses "sessionKey" to encrypt userID and "challenge," and then transmits the encrypted userID and "challenge" to Alipay Wallet.

Here, encrypting userID and transmitting the encrypted userID to Alipay Wallet is to verify whether the current user account of Alipay Wallet is the user having pre-enabled payment code payment at the terminal payment application.

Step 236, after using "sessionKey" for decryption, Alipay Wallet obtains userID and "challenge," and performs security verification on userID and "challenge."

Step 237, if the verification on both userID and "challenge" is successful, Alipay Wallet obtains an Otp seed according to the current userID, generates a payment code, uses "sessionKey" to encrypt the payment code, and returns the encrypted payment code to SDK.

Step 238, SDK uses "sessionKey" for decryption to obtain the payment code, and sends the payment code to the terminal payment application.

Step 239, the terminal payment application displays the payment code on the screen.

Figure 2E:
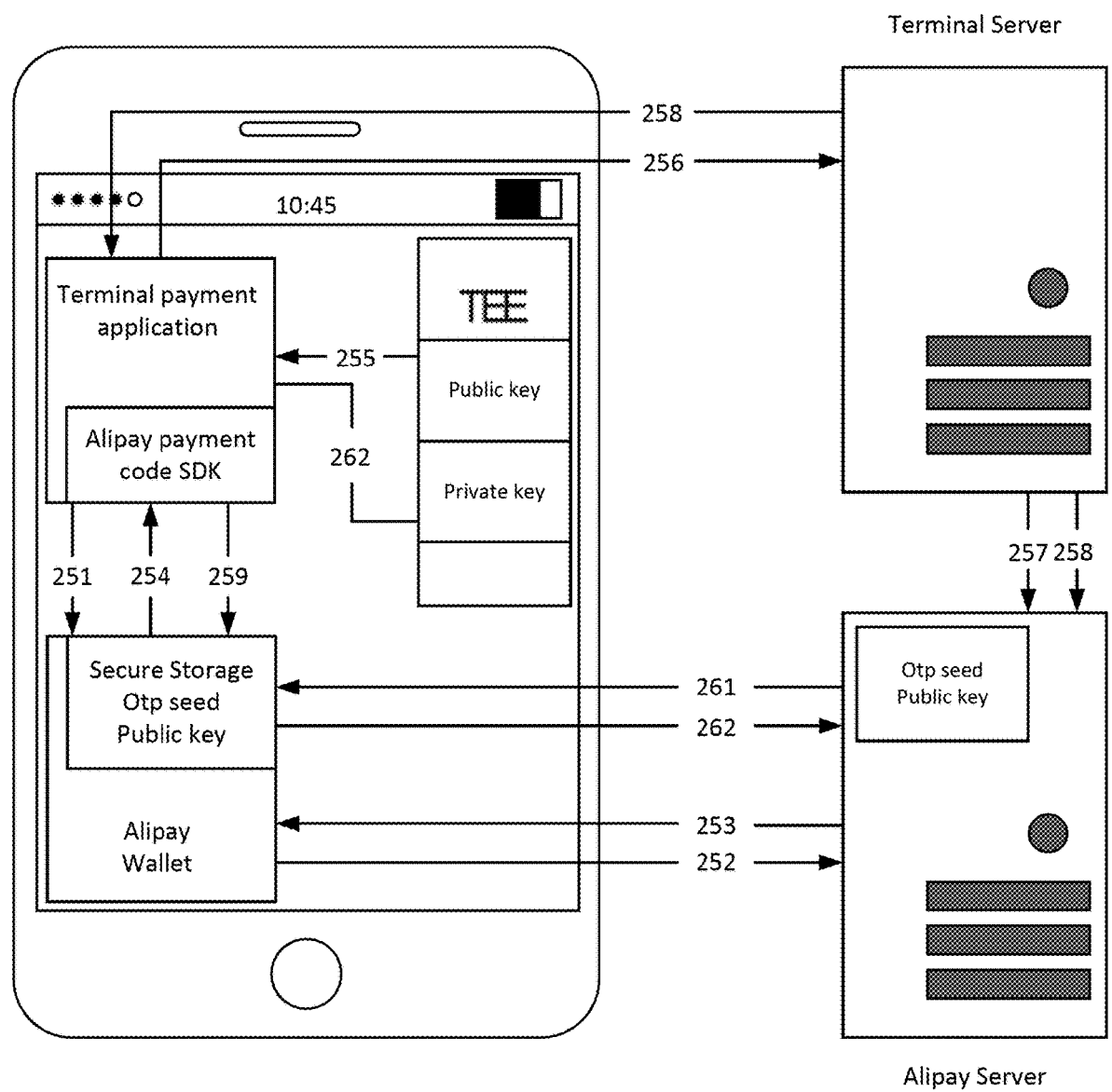
FIG. 2E is a flow chart of a method for providing graphic code information according to some other embodiments of the present application.

FIG. 2E is a flow chart of a method for providing graphic code information according to some embodiments of the present application. The flow chart illustrates the process in which the terminal payment application is associated with a user of the third-party payment application, i.e., the flow in which the payment code authorization is enabled. In the exemplary embodiment, take the third-party payment application being Alipay Wallet as an example, and the method comprises:

Step 251, the terminal payment application requests, via SDK, Alipay Wallet for an identity authorization code "AuthCode." If Alipay Wallet already has a logged-in account, the method proceeds directly to Step 254; otherwise, the method proceeds to Step 252.

Step 252, Alipay Wallet pops up a user log-in interface, and the user inputs the account number and log-in password to request to log in the Alipay server.

Step 253, assuming that the user account number and password are correct, then the log-in is successful, and the Alipay server generates "AuthCode" and returns "AuthCode" to Alipay.

Step 254, Alipay Wallet transmits, via SDK, "AuthCode" to the terminal payment application.

Step 255, the terminal payment application obtains the preset public key from the TEE.

Step 256, the terminal payment application uses a manufacturer-related security tunnel to upload the public key, a unique terminal identifier, and "AuthCode" to the terminal server, and at the same time, requests user information using "AuthCode."

Step 257, the terminal server transmits the public key, the unique terminal identifier, and "AuthCode" to the Alipay server.

Step 258, the Alipay server receives the public key, the unique terminal identifier, and "AuthCode," and after verifying that "AuthCode" is correct, the Alipay server associates the public key, the unique terminal identifier, and "AuthCode" for secure storage, and returns the user information to the terminal payment application via the terminal server, the user information comprising the user account userID.

Step 259, the terminal payment application initiates, via the Alipay payment code SDK, a payment code enabling request to Alipay Wallet, the request carrying the unique terminal identifier.

Step 260, Alipay Wallet transmits the request to the Alipay server.

Step 261, the Alipay server issues, according to the uploaded unique terminal identifier and user account, the corresponding public key and the one-time password seed used for generating the payment code to Alipay Wallet.

Step 262, Alipay Wallet uses the currently logged-in user ID as an index to safely store the encrypted public key and one-time password seed.

Figure 2F:
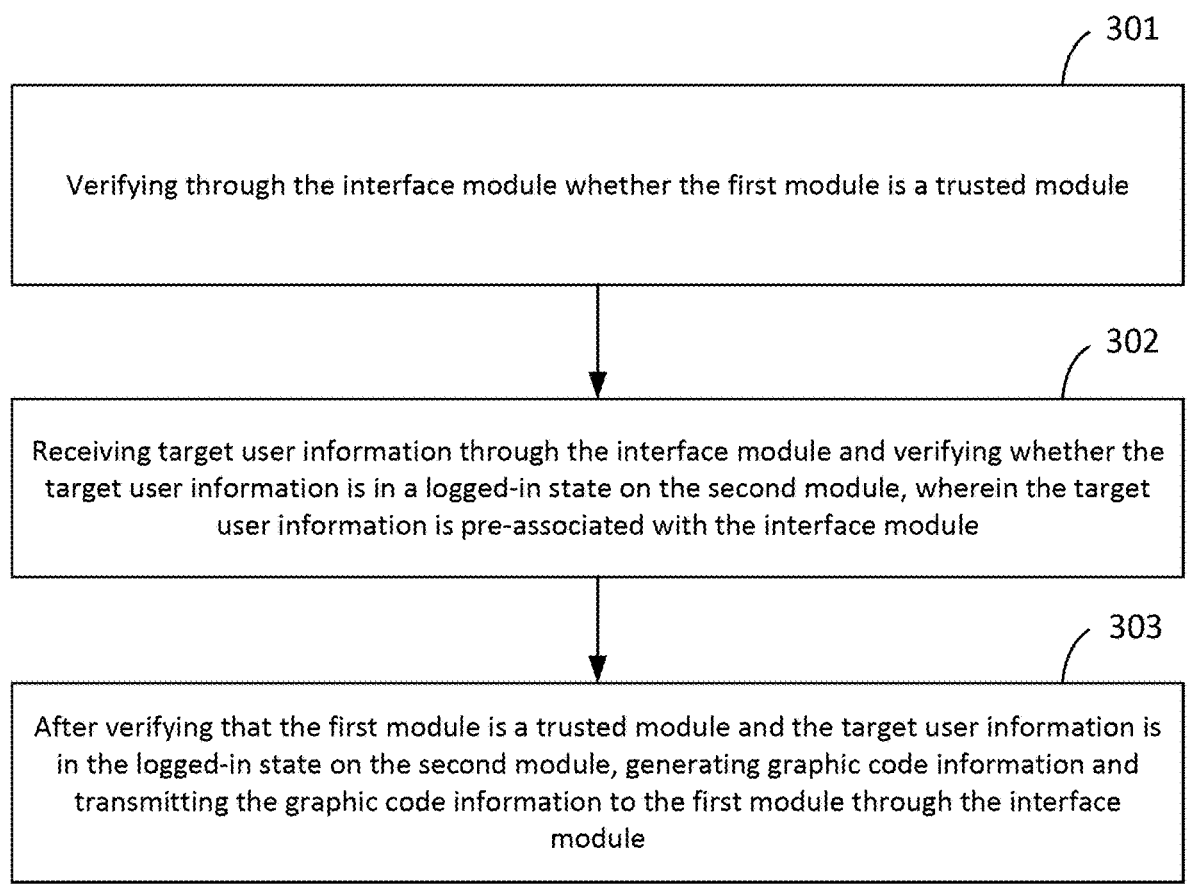
FIG. 2F is a flow chart of a method for providing graphic code information according to some other embodiments of the present application.

The solution for providing graphic code information according to the present application will be described below from the second module side. The method for providing graphic code information according to the exemplary embodiment can be applied in the second module as shown in FIG. 2F. As shown in FIG. 2F, the method comprises steps 301 to 303 as follows:

In step 301, verifying through the interface module whether the first module is a trusted module.

In step 302, receiving target user information through the interface module and verifying whether the target user information is in a logged-in state on the second module, wherein the target user information is pre-associated with the interface module.

In step 303, after verifying that the first module is a trusted module and the target user information is in the logged-in state on the second module, generating graphic code information and transmitting the graphic code information to the first module through the interface module.

In an optional implementation manner, verifying through the interface module whether the first module is a trusted module comprises:

generating and encrypting session information, and sending the encrypted session information to the first module through the interface module;

receiving, through the interface module, a decryption result from decryption of the encrypted session information and returned by the first module; and verifying, according to the decryption result, whether the first module is a trusted module.

In an optional implementation manner, the key used for encrypting the session information is a public key distributed by the first module in advance.

In an optional implementation manner, generating the session information comprises: randomly generating a session key as the session information;

verifying, according to the decryption result, whether the first module is a trusted module comprises:

receiving encrypted verification information sent by the interface module, and decrypting the encrypted verification information using the randomly generated session key; if the decryption is successful, determining that the first module is a trusted module.

In an optional implementation manner, generating graphic code information and transmitting the graphic code information to the first module through the interface module comprises:

after the graphic code information is generated, encrypting the graphic code information using the randomly generated session key, and transmitting the encrypted graphic code information to the first module through the interface module.

The embodiment described above can be referenced for detailed description of this exemplary embodiment, which will not be repeated herein.

Figure 2G:
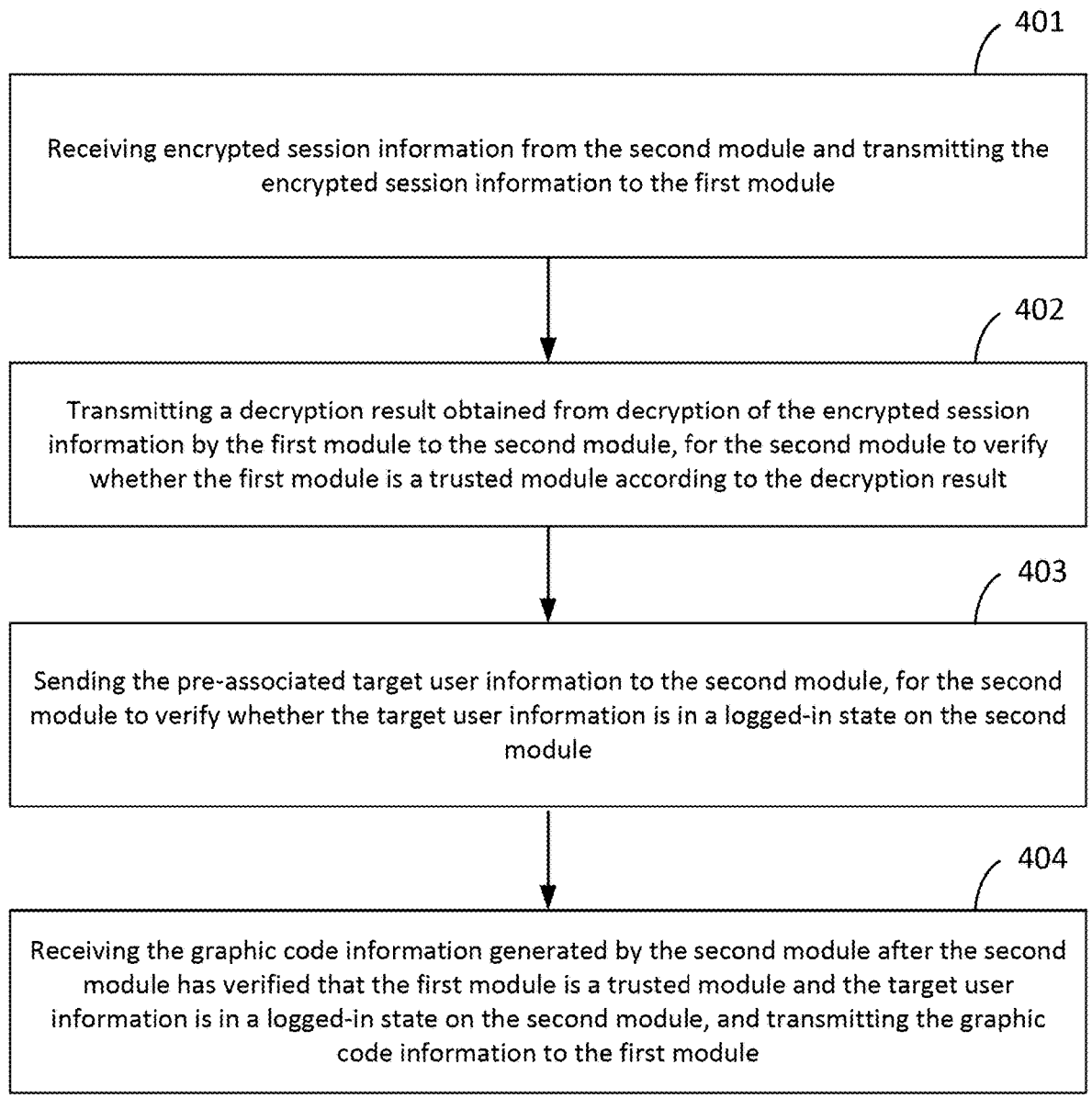
FIG. 2G is a flow chart of a method for providing graphic code information according to some other embodiments of the present application.

The solution according to the present application will be described below from the interface module side. The method for providing graphic code information according to the exemplary embodiment can be applied in the interface module as shown in FIG. 2G. As shown in FIG. 2G, the method comprises steps 401 to 404 as follows:

In step 401, receiving encrypted session information from the second module and transmitting the encrypted session information to the first module.

In step 402, transmitting a decryption result obtained from decryption of the encrypted session information by the first module to the second module, for the second module to verify whether the first module is a trusted module according to the decryption result.

In step 403, sending the pre-associated target user information to the second module, for the second module to verify whether the target user information is in a logged-in state on the second module.

In step 404, receiving the graphic code information generated by the second module after the second module has verified that the first module is a trusted module and the target user information is in a logged-in state on the second module, and transmitting the graphic code information to the first module.

In an optional implementation manner, the session information comprises a randomly generated session key;

transmitting a decryption result obtained from decryption of the encrypted session information by the first module to the second module comprises:

receiving a session key obtained through the decryption and sent by the first module, the decrypted session key being obtained after the first module successfully decrypts the encrypted session information;

encrypting verification information using the session key obtained through the decryption, and transmitting the encrypted verification information to the second module.

In an optional implementation manner, encrypting verification information using the session key obtained through the decryption, and transmitting the encrypted verification information to the second module comprises:

encrypting the target user information using the session key obtained through the decryption, and transmitting the encrypted target user information to the second module as the encrypted verification information.

In an optional implementation manner, the graphic code information generated by the second module is graphic code information encrypted by the second module using the randomly generated session key;

transmitting the graphic code information to the first module comprises:

receiving the encrypted graphic code information, and transmitting the graphic code information to the first module after decryption; here, the key used for decrypting the encrypted graphic code information is the session key obtained through the decryption by the first module.

The embodiment described above can be referenced for detailed description of this exemplary embodiment, which will not be repeated herein.

Figure 2H:
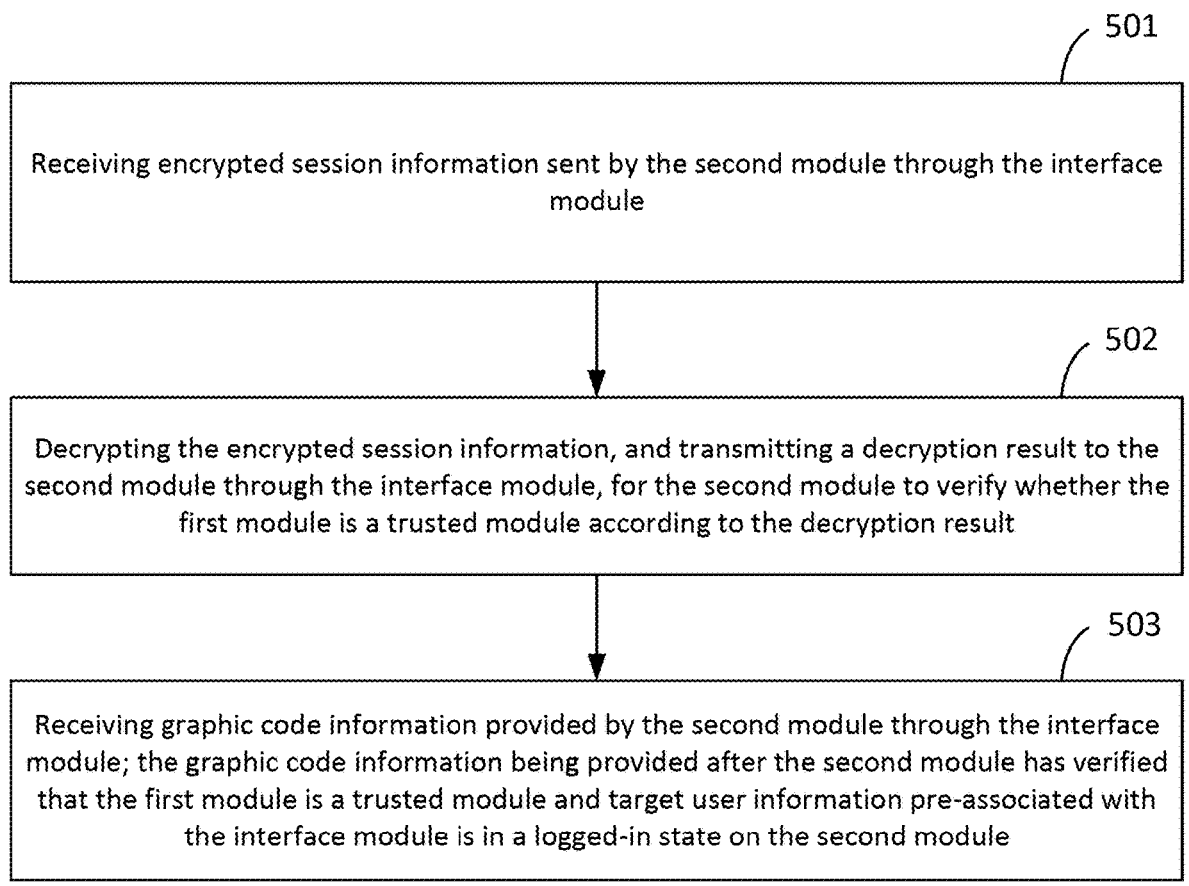
FIG. 2H is a flow chart of a method for providing graphic code information according to some other embodiments of the present application.

The solution according to the present application will be described below from the first module side. The method for providing graphic code information according to the exemplary embodiment can be applied in the first module shown in FIG. 2H. As shown in FIG. 2H, the method comprises steps 501 to 503 as follows:

In step 501, receiving encrypted session information sent by the second module through the interface module.

In step 502, decrypting the encrypted session information, and transmitting a decryption result to the second module through the interface module, for the second module to verify whether the first module is a trusted module according to the decryption result.

In step 503, receiving graphic code information provided by the second module through the interface module; the graphic code information being provided after the second module has verified that the first module is a trusted module and target user information pre-associated with the interface module is in a logged-in state on the second module.

In an optional implementation manner, the target user information is pre-associated with the interface module in the following manner:

initiating an association request to the second module through the interface module;

receiving, through the interface module, user identity authorization information sent by the second module according to the association request, the user identity authorization information being in a logged-in state on the second module;

sending the user identity authorization information, a public key preset in a TEE, and a preset unique device identifier to a server corresponding to the second module through a server corresponding to the first module; and receiving the target user information and transmitting the target user information to the interface module, wherein the target user information is transmitted by the server corresponding to the second module through the server corresponding to the first module after the server corresponding to the second module has verified the user identity authorization information to be correct.

The embodiment described above can be referenced for detailed description of this exemplary embodiment, which will not be repeated herein.

Corresponding to the method embodiments above, the present application further provides some embodiments of a device for providing graphic code information, a device for obtaining graphic code information, and a terminal on which the devices are applied.

Figure 3:
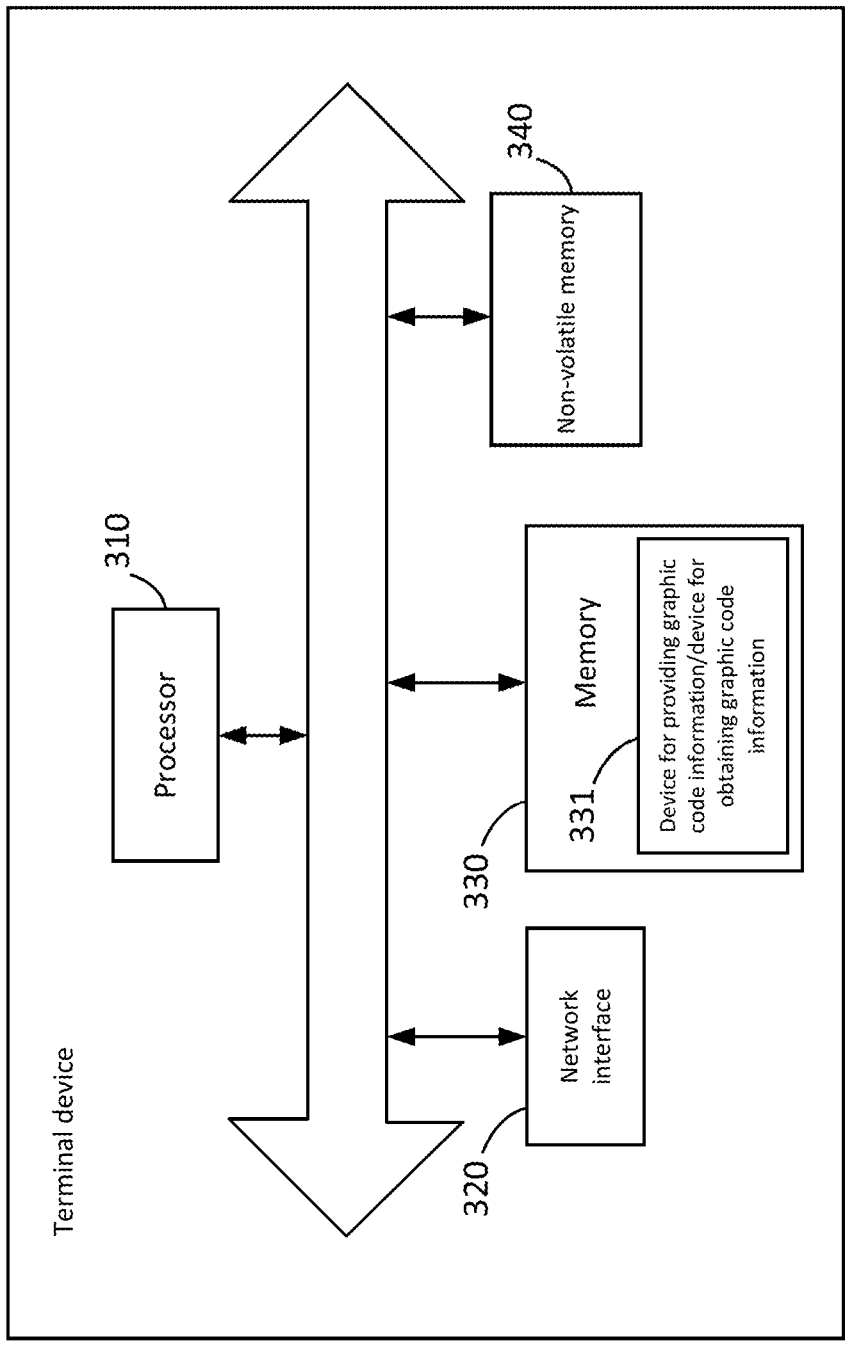
FIG. 3 is a hardware structural diagram of a terminal device in which a device for providing graphic code information or a device for obtaining graphic code information according to the present application is located.

Exemplary embodiments of the device for providing graphic code information/the device for obtaining graphic code information according to the present application can be applied on terminals. The device embodiments can be implemented by software, by hardware, or by a combination of software and hardware. Taking software implementation as an example, a device in the sense of logic is formed by a processor 310 of an electronic apparatus capable of reading computer program instructions in a non-volatile memory into a memory for execution. From the perspective of a hardware layer, FIG. 3 is a hardware structural diagram of a terminal device in which a device for providing graphic code information/a device for obtaining graphic code information according to the present application is located. In addition to the processor 310, memory 330, network interface 320, and non-volatile memory 340 shown in FIG. 3, the terminal device in which the device 331 is located typically may further comprise other hardware according to actual functions of the terminal device, which will not be described herein.

Figure 4:
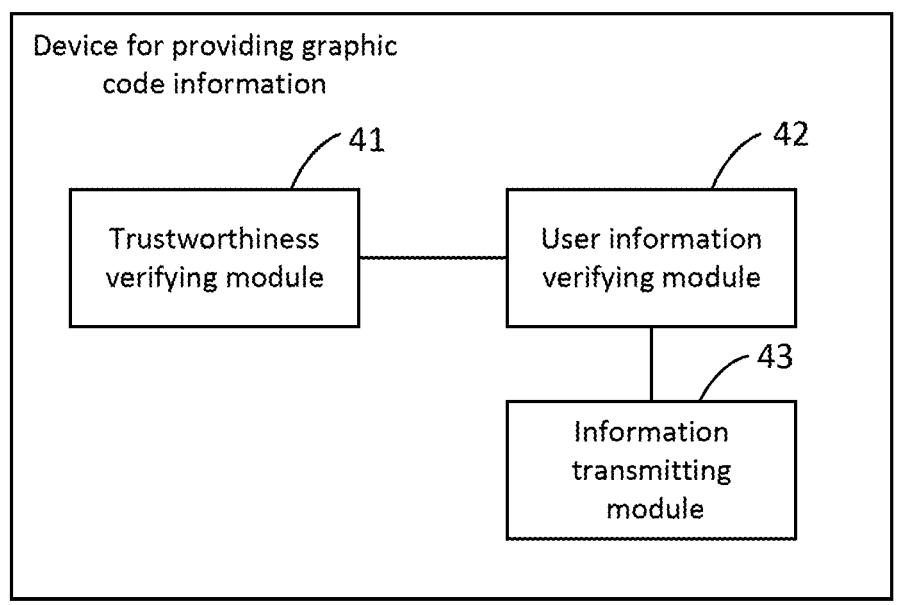
FIG. 4 is a block diagram of a device for providing graphic code information according to some embodiments of the present application.

FIG. 4 is a block diagram of a device for providing graphic code information according to an exemplary embodiment of the present application. The device for providing graphic code information is applied on a terminal comprising an interface apparatus and a first apparatus, and the device for providing graphic code information comprises:

a trustworthiness verifying module 41 configured to verify, through the interface apparatus, whether the first apparatus is a trusted apparatus;

a user information verifying module 42 configured to receive target user information through the interface apparatus and verify whether the target user information is in a logged-in state on a second apparatus, wherein the target user information is pre-associated with the interface apparatus; and an information transmitting module 43 configured to generate graphic code information and transmit the graphic code information to the first apparatus through the interface apparatus after it has been verified that the first apparatus is a trusted apparatus and the target user information is in a logged-in state on the second apparatus.

In an optional implementation manner, the trustworthiness verifying module 41 comprises:

a session information encrypting sub-module configured to generate and encrypt session information, and send the encrypted session information to the first module through the interface module;

a decrypting sub-module configured to receive, through the interface module, a decryption result from decryption of the encrypted session information and returned by the first module; and a verifying sub-module configured to verify, according to the decryption result, whether the first module is a trusted module.

In an optional implementation manner, the key used by the session information encrypting sub-module for encrypting the session information is a public key distributed by the first apparatus in advance.

In an optional implementation manner, generating the session information comprises: randomly generating a session key as the session information.

The verifying sub-module is further configured to receive encrypted verification information sent by the interface module, and decrypt the encrypted verification information using the randomly generated session key; if the decryption is successful, determine that the first module is a trusted module.

In an optional implementation manner, the information transmitting module 43 is further configured to:

after the graphic code information is generated, encrypt the graphic code information using the randomly generated session key, and transmit the encrypted graphic code information to the first module through the interface module.

Figure 5:
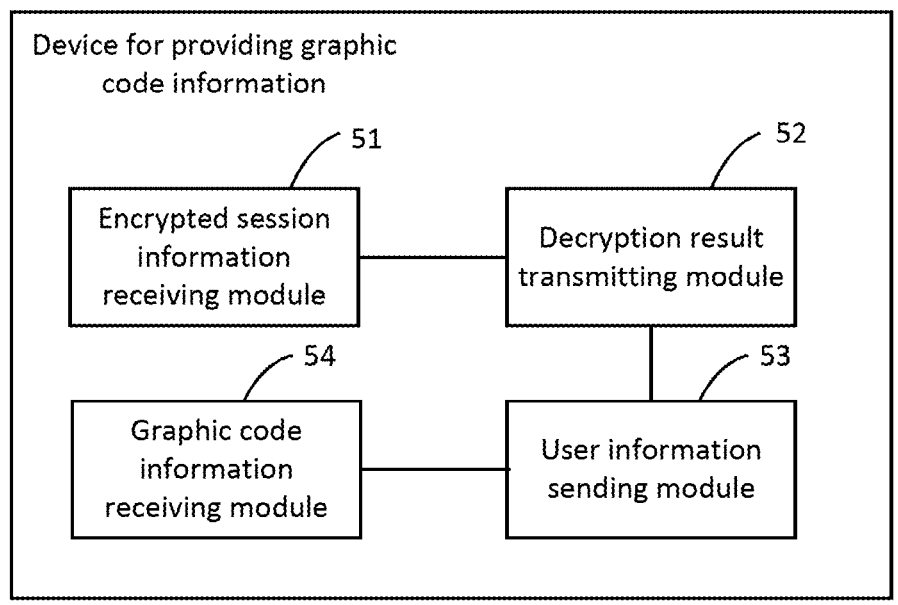
FIG. 5 is a block diagram of a device for providing graphic code information according to some other embodiments of the present application.

FIG. 5 is a block diagram of a device for providing graphic code information according to an exemplary embodiment of the present application. The device for providing graphic code information is applied on a terminal comprising a first apparatus and a second apparatus, and the device for providing graphic code information comprises:

an encrypted session information receiving module 51 configured to receive encrypted session information sent by the second apparatus and transmit the encrypted session information to the first apparatus;

a decryption result transmitting module 52 configured to transmit a decryption result obtained from decryption of the encrypted session information by the first apparatus to the second apparatus, for the second apparatus to verify whether the first apparatus is a trusted apparatus according to the decryption result;

a user information sending module 53 configured to send pre-associated target user information to the second apparatus, for the second apparatus to verify whether the target user information is in a logged-in state on the second apparatus; and a graphic code information receiving module 54 configured to receive the graphic code information generated by the second apparatus and transmit the graphic code information to the first apparatus after it has been verified that the first apparatus is a trusted apparatus and the target user information is in a logged-in state on the second apparatus.

In an optional implementation manner, the session information comprises a randomly generated session key.

The decryption result transmitting module 52 comprises:

a session key receiving sub-module configured to receive a session key obtained through the decryption and sent by the first module, the decrypted session key being obtained after the first module successfully decrypts the encrypted session information; and a verification information encrypting and transmitting module configured to encrypt verification information using the session key obtained through the decryption, and transmit the encrypted verification information to the second module.

In an optional implementation manner, the verification information encrypting and transmitting module is further configured to:

encrypt the target user information using the session key obtained through the decryption, and transmit the encrypted target user information to the second module as the encrypted verification information.

The graphic code information generated by the second module is graphic code information encrypted by the second module using the randomly generated session key.

The graphic code information receiving module 54 is further configured to:

receive the encrypted graphic code information, and transmit the graphic code information to the first module after decryption; here, the key used for decrypting the encrypted graphic code information is the session key obtained through the decryption by the first module.

Figure 6:
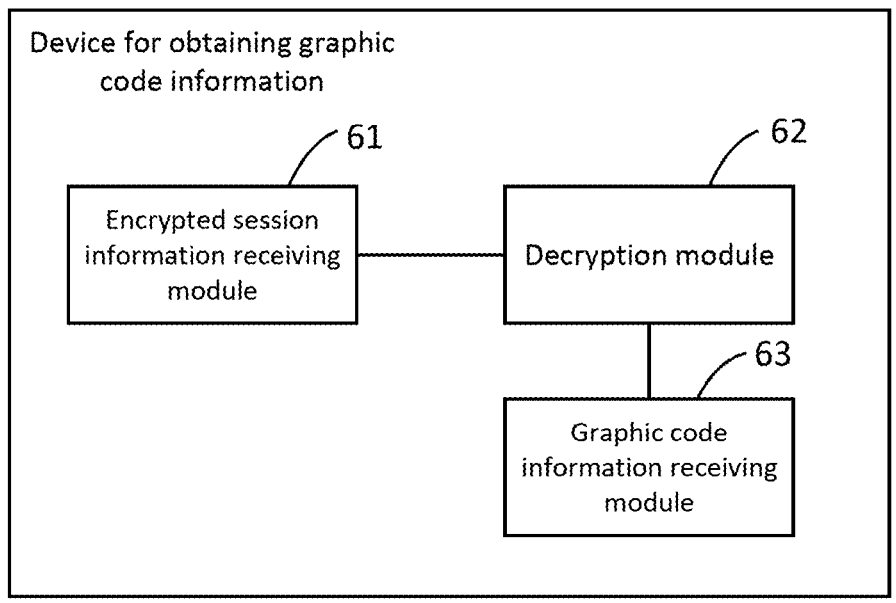
FIG. 6 is a block diagram of a device for obtaining graphic code information according to some other embodiments of the present application.

FIG. 6 is a block diagram of a device for obtaining graphic code information according to an exemplary embodiment of the present application. The device for obtaining graphic code information is applied on a terminal comprising an interface apparatus and a second apparatus, and the device for obtaining graphic code information comprises:

an encrypted session information receiving module 61 configured to receive encrypted session information sent by the second apparatus through the interface apparatus;

a decryption module 62 configured to decrypt the encrypted session information, and transmit a decryption result to the second apparatus through the interface apparatus, for the second apparatus to verify whether the first apparatus is a trusted apparatus according to the decryption result; and a graphic code information receiving module 63 configured to receive the graphic code information provided by the second apparatus through the interface apparatus; the graphic code information being provided after the second apparatus has verified that the first module is a trusted apparatus and target user information pre-associated with the interface apparatus is in a logged-in state on the second apparatus.

In an optional implementation manner, the device further comprises an associating module configured to initiate an association request to the second module through the interface module; receive, through the interface module, user identity authorization information sent by the second module according to the association request, the user identity authorization information being in a logged-in state on the second module; send the user identity authorization information, a public key preset in TEE, and a preset unique device identifier to a server corresponding to the second module through a server corresponding to the first module; and receive the target user information and transmit the target user information to the interface module, wherein the target user information is transmitted by the server corresponding to the second module through the server corresponding to the first module after the server corresponding to the second module has verified the user identity authorization information to be correct.

Correspondingly, some embodiments of the present application further provide a terminal, comprising: a processor; a memory for storing processor-executable instructions; wherein the processor is configured to:

verify, by a second module through an interface module, whether a first module is a trusted module;

receive, by the second module, target user information and verify, by the second module, whether the target user information is in a logged-in state on the second module, wherein the target user information is pre-associated with the interface module; and generate, by the second module, graphic code information after verifying that the first module is a trusted module and the target user information is in the logged-in state on the second module, and transmit, by the second module, the graphic code information to the first module through the interface module.

For detailed information regarding implementation of functions and roles of each module of the above devices, the implementation process of corresponding steps in the above methods may be referenced, which will not be repeated herein.

Since the device embodiment substantially corresponds to the method embodiment, the description of the method embodiment can be referenced for relevant parts. The device embodiment described above is merely exemplary, where the modules described as separate parts may or may not be physically separated. The parts displayed as modules may or may not be physical modules, i.e., the modules can be at the same place or be distributed to a plurality of network modules. Some or all modules thereof may be selected as needed to achieve the objective of the solution of the present application. The present application can be understood and implemented by a person skilled in the art without creative effort.

After considering the description and practicing the application herein, one skilled in the art would easily conceive of other implementation solutions of the present application. The present application is intended to encompass any variations, uses, or adaptive changes of the present application. These variations, uses, or adaptive changes follow general principles of the present application and comprise common general knowledge or common technical means in the art that is not applied for by the present application. The description and embodiments are regarded as exemplary only, and the true scope and spirit of the present application shall be subject to the appended claims.

It should be understood that the present application is not limited to the precise structure described and illustrated in the accompanying drawings above, and various modifications and variations can be made without departing from the scope of the present application. The scope of the present application is only subject to the appended claims.

Only preferred embodiments of the present application are described above, and the embodiments are not used to limit the present application. Any modifications, equivalent substitutions, and improvements made within the spirit and principle of the present application shall fall within the scope of the present application.

What is claimed is:

1. A method for providing graphic code information, wherein the method is implementable by a device comprising a first module, a second module, and an interface module, the method comprising:
   the second module sending an encrypted session key to the first module;
   the first module decrypting the encrypted session key, and in response to that the first module successfully completes the decryption and obtains the session key, the first module transmitting the session key to the interface module;
   the interface module using the session key to encrypt target user information that is pre-associated with the interface module, and transmitting the encrypted target user information to the second module;
   the second module receiving the encrypted target user information, decrypting the encrypted target user information with the session key, and in response to that the decryption is successful, the second module determining that the first module is a trusted module and obtaining the target user information;
   the second module matching the obtained target user information with user information in a logged-in state on the second module, and verifying that the target user information is in the logged-in state on the second module when the obtained target user information matches the user information in the logged-in state on the second module; and
   after determining that the first module is the trusted module and the target user information is in the logged-in state on the second module, the second module generating graphic code information and transmitting the graphic code information to the first module through the interface module.

2. The method according to claim 1, further comprising the second module generating the session key, and encrypting the session key before sending the encrypted session key to the first module.

3. The method according to claim 1, wherein the second module generating and transmitting the graphic code information to the first module through the interface module comprises:
   the second module using the session key to encrypt the graphic code information and transmitting the encrypted graphic code information to the interface module; and
   the interface module receiving the encrypted graphic code information, decrypting the encrypted graphic code information with the session key obtained from the first module, and transmitting the decrypted graphic code information to the first module.

4. The method according to claim 1, wherein the target user information is pre-associated with the interface module by:
   the first module initiating an association request to the second module through the interface module;
   the second module sending user identity authorization information, which is in a logged-in state, to the first module through the interface module;
   the first module sending the user identity authorization information, a public key preset in a Trusted Execution Environment (TEE), and a preset unique device identifier of the device to a second server corresponding to the second module through a first server corresponding to the first module; and
   the first module receiving the target user information and transmitting the target user information to the interface module, wherein the target user information is transmitted by the second server corresponding to the second module through the first server corresponding to the first module after the second server corresponding to the second module verifies the user identity authorization information to be correct.

5. The method according to claim 1, further comprising:
   the second module encrypting the session key with a public key of the first module,
   wherein the first module decrypting the encrypted session key comprises the first module decrypting the encrypted session key with a private key of the first module.

6. The method according to claim 1, further comprising:
   the second module generating a random number,
   wherein the second module sending the encrypted session key to the first module comprises:
   the second module encrypting the random number and the session key with a public key of the first module.

7. The method according to claim 6, wherein the first module decrypting the encrypted session key comprises:
   the first module decrypting the encrypted random number and the encrypted session key with a private key of the first module.

8. One or more non-transitory computer-readable storage media storing instructions that, when executed by at least one processor, cause the at least one processor to perform operations comprising:
   a second module sending an encrypted session key to a first module;
   the first module decrypting the encrypted session key, and in response to that the first module successfully completes the decryption and obtains the session key, the first module transmitting the session key to an interface module;
   the interface module using the session key to encrypt target user information that is pre-associated with the interface module, and transmitting the encrypted target user information to the second module;
   the second module receiving the encrypted target user information, decrypting the encrypted target user information with the session key, and in response to that the decryption is successful, the second module determining that the first module is a trusted module and obtaining the target user information;
   the second module matching the obtained target user information with user information in a logged-in state on the second module, and verifying that the target user information is in the logged-in state on the second module when the obtained target user information matches the user information in the logged-in state on the second module; and
   after determining that the first module is the trusted module and the target user information is in the logged-in state on the second module, the second module generating graphic code information and transmitting the graphic code information to the first module through the interface module.

9. The one or more non-transitory computer-readable storage media according to claim 8, wherein the operations further comprise the second module generating the session key, and encrypting the session key before sending the encrypted session key to the first module.

10. The one or more non-transitory computer-readable storage media according to claim 8, wherein the second module generating and transmitting the graphic code information to the first module through the interface module comprises:
    the second module using the session key to encrypt the graphic code information and transmitting the encrypted graphic code information to the interface module; and
    the interface module receiving the encrypted graphic code information, decrypting the encrypted graphic code information with the session key obtained from the first module, and transmitting the decrypted graphic code information to the first module.

11. The one or more non-transitory computer-readable storage media according to claim 8, wherein the target user information is pre-associated with the interface module by:
    the first module initiating an association request to the second module through the interface module;
    the second module sending user identity authorization information, which is in a logged-in state, to the first module through the interface module;
    the first module sending the user identity authorization information, a public key preset in a Trusted Execution Environment (TEE), and a preset unique device identifier of the device to a second server corresponding to the second module through a first server corresponding to the first module; and
    the first module receiving the target user information and transmitting the target user information to the interface module, wherein the target user information is transmitted by the second server corresponding to the second module through the first server corresponding to the first module after the second server corresponding to the second module verifies the user identity authorization information to be correct.

12. The one or more non-transitory computer-readable storage media according to claim 8, wherein the operations further comprise:
    the second module encrypting the session key with a public key of the first module, wherein the first module decrypting the encrypted session key comprises the first module decrypting the encrypted session key with a private key of the first module.

13. The one or more non-transitory computer-readable storage media according to claim 8, wherein the operations further comprise:
    the second module generating a random number,
    wherein the second module sending the encrypted session key to the first module comprises:
    the second module encrypting the random number and the session key with a public key of the first module.

14. The one or more non-transitory computer-readable storage media according to claim 13, wherein the first module decrypting the encrypted session key comprises:

the first module decrypting the encrypted random number and the encrypted session key with a private key of the first module.

15. An apparatus comprising one or more processors and a memory configured with computer code, wherein the one or more processors are configured to execute the computer code to perform operations comprising:

a second module sending an encrypted session key to a first module;

the first module decrypting the encrypted session key, and in response to that the first module successfully completes the decryption and obtains the session key, the first module transmitting the session key to an interface module;

the interface module using the session key to encrypt target user information that is pre-associated with the interface module, and transmitting the encrypted target user information to the second module;

the second module receiving the encrypted target user information, decrypting the encrypted target user information with the session key, and in response to that the decryption is successful, the second module determining that the first module is a trusted module and obtaining the target user information;

the second module matching the obtained target user information with user information in a logged-in state on the second module, and verifying that the target user information is in the logged-in state on the second module when the obtained target user information matches the user information in the logged-in state on the second module; and after determining that the first module is the trusted module and the target user information is in the logged-in state on the second module, the second module generating graphic code information and transmitting the graphic code information to the first module through the interface module.

16. The apparatus according to claim 15, wherein the operations further comprise the second module generating the session key, and encrypting the session key before sending the encrypted session key to the first module.

17. The apparatus according to claim 15, wherein the second module generating and transmitting the graphic code information to the first module through the interface module comprises:

the second module using the session key to encrypt the graphic code information and transmitting the encrypted graphic code information to the interface module; and the interface module receiving the encrypted graphic code information, decrypting the encrypted graphic code information with the session key obtained from the first module, and transmitting the decrypted graphic code information to the first module.

18. The apparatus according to claim 15, wherein the target user information is pre-associated with the interface module by:

the first module initiating an association request to the second module through the interface module;

the second module sending user identity authorization information, which is in a logged-in state, to the first module through the interface module;

the first module sending the user identity authorization information, a public key preset in a Trusted Execution Environment (TEE), and a preset unique device identifier of the device to a second server corresponding to the second module through a first server corresponding to the first module; and the first module receiving the target user information and transmitting the target user information to the interface module, wherein the target user information is transmitted by the second server corresponding to the second module through the first server corresponding to the first module after the second server corresponding to the second module verifies the user identity authorization information to be correct.

19. The apparatus according to claim 15, wherein the operations further comprise:

the second module encrypting the session key with a public key of the first module, wherein the first module decrypting the encrypted session key comprises the first module decrypting the encrypted session key with a private key of the first module.

20. The apparatus according to claim 15, wherein the operations further comprise:

the second module generating a random number, wherein the second module sending the encrypted session key to the first module comprises:

the second module encrypting the random number and the session key with a public key of the first module; and wherein the first module decrypting the encrypted session key comprises:

the first module decrypting the encrypted random number and the encrypted session key with the a private key of the first module.

* * * * *